United States Patent
Yamamoto et al.

(10) Patent No.: US 10,345,498 B2
(45) Date of Patent: Jul. 9, 2019

(54) INFRARED CUT FILTER, SOLID-STATE IMAGING DEVICE, AND IMAGING/DISPLAY APPARATUS

(71) Applicant: AGC Inc., Chiyoda-ku (JP)

(72) Inventors: Kyoko Yamamoto, Tokyo (JP); Takaaki Murakami, Tokyo (JP); Mitsuyuki Tatemura, Haibara-gun (JP); Hiroshi Kumai, Tokyo (JP)

(73) Assignee: AGC Inc., Chiyoda-ku (JP)

( * ) Notice: Subject to any disclaimer, the term of this patent is extended or adjusted under 35 U.S.C. 154(b) by 626 days.

(21) Appl. No.: 14/870,751

(22) Filed: Sep. 30, 2015

(65) Prior Publication Data

US 2016/0018576 A1 Jan. 21, 2016

Related U.S. Application Data

(63) Continuation of application No. PCT/JP2014/060344, filed on Apr. 9, 2014.

(30) Foreign Application Priority Data

Apr. 10, 2013 (JP) ................................ 2013-082509

(51) Int. Cl.
*G02B 5/20* (2006.01)
*C09B 57/10* (2006.01)
(Continued)

(52) U.S. Cl.
CPC .............. *G02B 5/208* (2013.01); *C09B 49/12* (2013.01); *C09B 57/10* (2013.01); *G02B 5/223* (2013.01); *G03B 11/00* (2013.01)

(58) Field of Classification Search
CPC ...... G02B 5/30; G02B 5/3025; G02B 5/3058; G02B 5/3066; G02B 5/3075
(Continued)

(56) References Cited

U.S. PATENT DOCUMENTS 5,242,868 A 9/1993 Hara
2010/0021833 A1* 1/2010 Lehmann .............. B29B 13/024
430/31
(Continued)

FOREIGN PATENT DOCUMENTS

CN 101950096 A 1/2011
CN 103827705 A 5/2014
(Continued)

OTHER PUBLICATIONS

International Search Report dated Jun. 10, 2014 in PCT/JP2014/060344 filed on Apr. 9, 2014.
(Continued)

*Primary Examiner* — Robert E. Tallman
(74) *Attorney, Agent, or Firm* — Oblon, McClelland, Maier & Neustadt, L.L.P.

(57) ABSTRACT

Provided is an infrared cut filter including: an infrared absorbing layer of a transparent resin containing an infrared absorber; and a selected wavelength cut layer stacked on the infrared absorbing layer, wherein the following requirements are satisfied. (i) In a spectral transmittance curve for an incident angle of 0°, an average transmittance in a 450-600 nm range is 80% or more, a transmittance in a 700-1200 nm range is 2.0% or less, and $D_0$ represented by the following expression is less than 0.04. $D_0$ (%/nm)= (Tmax·0−Tmin·0)/(λ(Tmax·0)−λ(Tmin·0)) (ii) wherein a spectrum transmittance curve for an incident angle of 30°, an average transmittance in the 450 to 600 nm range is 80% or more, a transmittance in the 700-1200 nm range is 2.0% or less, and $D_{30}$ represented by the following expression is less than 0.04. $D_{30}$ (%/nm)=(Tmax·30−Tmin·30)/(λ (Tmax·30)−×(Tmin·30))

8 Claims, 12 Drawing Sheets

(51) Int. Cl.
*G02B 5/22* (2006.01)
*C09B 49/12* (2006.01)
*G03B 11/00* (2006.01)

(58) Field of Classification Search
USPC .................. 359/485.01, 485.03, 485.05
See application file for complete search history.

(56) References Cited

U.S. PATENT DOCUMENTS

| | | | |
|---|---|---|---|
| 2011/0007204 A1 | 1/2011 | Yamano | |
| 2015/0346403 A1* | 12/2015 | Jidai | B32B 7/02 |
| | | | 348/164 |

FOREIGN PATENT DOCUMENTS

| | | |
|---|---|---|
| DE | 39 06 320 A1 | 9/1989 |
| JP | 01-219037 A | 9/1989 |
| JP | 2008-070827 A | 3/2008 |
| JP | 2009-267396 A | 11/2009 |
| JP | 2012-137649 A | 7/2012 |
| JP | 2012-185468 A | 9/2012 |
| JP | 2013-050593 A | 3/2013 |
| KR | 2014-0068982 | 6/2014 |
| TW | 201319632 A | 5/2013 |
| WO | WO 2013/042738 A1 | 3/2013 |

OTHER PUBLICATIONS

International Preliminary Report on Patentability and Written Opinion dated Oct. 22, 2015 in PCT/JP2014/060344.

Combined Office Action and Search Report dated Dec. 28, 2016 in Chinese Patent Application No. 201480020028.X (with English translation of the Office Action and English translation of categories of cited documents).

* cited by examiner

INFRARED CUT FILTER, SOLID-STATE IMAGING DEVICE, AND IMAGING/DISPLAY APPARATUS

CROSS-REFERENCE TO RELATED APPLICATIONS

This application is a continuation of prior International Application No. PCT/JP2014/060344 filed on Apr. 9, 2014 which is based upon and claims the benefit of priority from Japanese Patent Application No. 2013-082509 filed on Apr. 10, 2013; the entire contents of all of which are incorporated herein by reference.

FIELD

Embodiments described herein generally relate to an infrared cut filter, and a solid-state imaging device and an imaging/display apparatus using the infrared cut filter.

BACKGROUND

In recent years, infrared cut filters transmitting light in a visible wavelength range (420 to 630 nm), but cutting light in a near-infrared wavelength range (700 to 1100 nm) have been used in various applications.

For example, in imaging apparatuses such as a digital still camera, a digital video, a cellular phone camera using solid-state imaging devices such as a CCD (Charge Coupled Device) and a CMOS (Complementary Metal Oxide Semiconductor) image sensor, and display apparatuses such as an automatic exposure meter using a light-receiving element, there is conventionally a spectral sensitivity from the visible wavelength range to the near-infrared wavelength range around 1100 nm. Accordingly, the infrared cut filter as stated above is disposed between an imaging lens and the solid-state imaging device or the light-receiving element to correct visibility so as to approximate the sensitivity of the solid-state imaging device or the light-receiving element to the visibility of a person to obtain good color reproducibility.

As the infrared cut filter as stated above, for example, a filter is known made up of a glass where CuO or the like is added to a fluorophosphate-based glass and a phosphate-based glass so as to selectively absorb the light in the near-infrared wavelength range. This glass filter contains CuO with a lot of $P_2O_5$ as an essential component, and exhibits blue-green by forming $Cu^{2+}$ ion coordinated at a lot of oxygen ions in an oxidizing melting atmosphere, and exerts a near-infrared absorption characteristic.

However, an absorption ability in the near-infrared wavelength range of this glass filter is lowered as it goes to a long-wavelength side. It is possible to increase the absorption ability in the near-infrared wavelength range by increasing an addition amount of CuO, but a Cu ion concentration which has absorption in a visible short-wavelength region is simultaneously increased, and therefore, a transmittance of light in a visible wavelength range is lowered.

Accordingly, practically, an optical interference multi-layer film in which two or more kinds of dielectric thin films having a refractive index difference which are transparent or have an absorption in an infrared wavelength range are alternately stacked at one surface or both surfaces of a substrate of the above-stated glass is formed to thereby compensate the near-infrared cutting ability of the glass to be used as an infrared cut filter having a cutting property up to around 1100 nm.

On the other hand, in recent years, in a solid-state imaging device, a pixel number becomes larger, and sensitivity becomes higher, and one capable of receiving light in a long-wavelength range over 1200 nm becomes popular. Namely, in recent years, a small-sized and high resolution solid-state imaging device has been required, and there is a tendency to increase in number of pixel number large without enlarging a light-receiving area. As a result, resulting from decrease in an absolute amount of incident light in accordance with an area reduction in a unit pixel size, an electron number per each pixel to be an original of an output signal decreases, sensor sensitivity (a current output in accordance with light intensity at a semiconductor layer) decreases, and it becomes essential to make the sensitivity per pixel high. Therefore, it is general to increase an absorption amount by thickening the semiconductor layer, but electromagnetic wave absorption coefficients by the semiconductor layer are smaller in a long-wavelength component compared to a short-wavelength component, and therefore, the long-wavelength component reaches a semiconductor deep layer part. Accordingly, one capable of receiving the light having the longer wavelength such as over 1200 nm compared to a conventional one increases.

Besides, a mechanism to cut the light in the near-infrared wavelength range by the dielectric multilayer film is owing to a reflection action of light resulting from an interference of substances having the refractive index difference as stated above. Therefore, it enables a steep cutoff characteristic. On the other hand, the light in the near-infrared range which is incident on the dielectric multilayer film is reflected by the dielectric multilayer film, but becomes stray light in the imaging/display apparatus including the solid-state imaging device without being attenuated. This stray light is obliquely incident on the dielectric multilayer film again, and thereby, there is a possibility in which the stray light reaches the solid-state imaging device to be recognized as noises without being fully cut by the dielectric multilayer film.

Further, a digital still camera embedded in a recent smartphone has been reduced in thickness, and an optical path length from a previous stage lens to an imaging apparatus becomes short. As a result, there is a tendency in which the light which is obliquely incident on the infrared cut filter increases more and more. Therefore, a reflection and light-shielding characteristic by the dielectric multilayer film is further wavelength-shifted, and the light-shielding characteristic at a band from 1100 nm to over 1200 nm becomes insufficient.

Accordingly, in the infrared cut filter, improvement in the cutting performance at the band from 1100 nm to over 1200 nm has been required. For example, it is conceivable to increase a thickness of a glass filter to enable this object. However, in this case, a device thickness increases, and it is impossible to meet the demand or the like for reduction in thickness of the digital still camera. Besides, it is possible to elongate the cut wavelength range by the dielectric multi-layer film up to the long-wavelength range over 1200 nm, but it is necessary to increase the number of stacks and a total film thickness. As a result, the number of processes increases, in addition, there is a problem of foreign substances attached to a film at a film forming time, and other problems such as lowering of production yield and increase in manufacturing cost are incurred.

SUMMARY

The present invention is made to solve the above-stated conventional problems, and an object thereof is to provide an infrared cut filter capable of enough and effectively cutting infrared light in a long-wavelength range over 1200 nm regardless of an incident angle of light while keeping high transmittance for visible light, and without incurring problems such as lowering of production yield and increase in manufacturing cost, and a solid-state imaging device and an imaging/display apparatus including the infrared cut filter as stated above.

An infrared cut filter according to an aspect of the present invention includes: an infrared absorbing layer of a transparent resin containing an infrared absorber; and a selected wavelength cut layer stacked on the infrared absorbing layer, wherein requirements of the following (i) and (ii) are satisfied.

(i) In a spectral transmittance curve for an incident angle of "0" (zero) degree, an average transmittance in the wavelength range of 450 to 600 nm is 80% or more, a transmittance in the wavelength range of 700 to 1200 nm is 2.0% or less, and a transmittance variation $D_0$ represented by the following expression (1) is less than 0.04.

$$D_0(\%/nm) = (Tmax\cdot 0 - Tmin\cdot 0)/(\lambda(Tmax\cdot 0) - \lambda(Tmin\cdot 0)) \quad (1)$$

wherein Tmax·0 and Tmin·0 are respectively a maximum transmittance and a minimum transmittance in a wavelength range of 1100 to 1250 nm, and $\lambda(Tmax\cdot 0)$ is a wavelength showing the maximum transmittance Tmax·0, and $\lambda(Tmin\cdot 0)$ is a wavelength showing the minimum transmittance Tmin·0.

(ii) In a spectrum transmittance curve for an incident angle of 30 degrees, an average transmittance in the wavelength range of 450 to 600 nm is 80% or more, a transmittance in the wavelength range of 700 to 1200 nm is 2.0% or less, and a transmittance variation $D_{30}$ represented by the following expression (2) is less than 0.04.

$$D_{30}(\%/nm) = (Tmax\cdot 30 - Tmin\cdot 30)/(\lambda(Tmax\cdot 30) - \lambda(Tmin\cdot 30)) \quad (2)$$

wherein Tmax·30 and Tmin·30 are respectively a maximum transmittance and a minimum transmittance in the wavelength range of 1100 to 1250 nm, and $\lambda(Tmax\cdot 30)$ is a wavelength showing the maximum transmittance Tmax·30, and $\lambda(Tmin\cdot 30)$ is a wavelength showing the minimum transmittance Tmin·30.

A solid-state imaging device according to another aspect of the present invention includes the infrared cut filter.

An imaging/display apparatus according to still another aspect of the present invention includes the infrared cut filter.

According to the present invention, it is possible to provide an infrared cut filter capable of enough and effectively cutting infrared light in a long-wavelength range over 1200 nm regardless of an incident angle of light while keeping high transmittance for visible light, and without incurring problems such as lowering of production yield and increase in manufacturing cost, and a solid-state imaging device and an imaging/display apparatus including the infrared cut filter as stated above.

DETAILED DESCRIPTION

Figure 1:
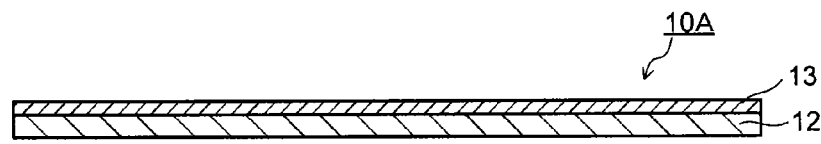
FIG. 1 is a sectional view schematically illustrating an infrared cut filter according to an embodiment of the present invention.

Hereinafter, embodiments of the present invention are described. The embodiments will be described based on the drawings, but these drawings are provided only for an illustrative purpose and by no means are intended to limit the present invention. Besides, please be noted that the drawings are schematic ones, and a relationship between a thickness and a flat dimension, a ratio of the thickness, and so on are different from actual ones. Further, in the following description, the same reference numerals and symbols are used to designate components having the same and corresponding function and constitution, and the redundant description thereof will not be given.

FIG. 1 is a sectional view schematically illustrating an infrared cut filter according to an embodiment of the present invention.

As illustrated in FIG. 1, an infrared cut filter 10A of the embodiment includes an infrared absorbing layer 12 made up of a transparent resin including an infrared absorber, and a selected wavelength cut layer 13 made up of a dielectric multilayer film.

This infrared cut filter 10A satisfies requirements of the following (i) and (ii).

(i) In a spectral transmittance curve when an incident angle is "0" (zero) degree, an average transmittance in the wavelength range of 450 to 600 nm is 80% or more, a transmittance in the wavelength range of 700 to 1200 nm is 2.0% or less, and a transmittance variation $D_0$ represented by the following expression (1) is less than 0.04.

$$D_0(\%/nm)=(Tmax\cdot 0-Tmin\cdot 0)/(\lambda(Tmax\cdot 0)-\lambda(Tmin\cdot 0)) \quad (1)$$

(In the expression, Tmax·0 and Tmin·0 are respectively a maximum transmittance and a minimum transmittance in a wavelength region of 1100 to 1250 nm, and $\lambda$(Tmax·0) is a wavelength showing the maximum transmittance Tmax·0, and $\lambda$(Tmin·0) is a wavelength showing the minimum transmittance Tmin·0.)

(ii) In a spectrum transmittance curve when an incident angle is 30 degrees, an average transmittance in the wavelength range of 450 to 600 nm is 80% or more, a transmittance in a wavelength range of 700 to 1200 nm is 2.0% or less, and a transmittance variation $D_{30}$ represented by the following expression (2) is less than 0.04.

$$D_{30}(\%/nm)=(Tmax\cdot 30-Tmin\cdot 30)/(\lambda(Tmax\cdot 30)-\lambda(Tmin\cdot 30)) \quad (2)$$

(In the expression, Tmax·30 and Tmin·30 are respectively a maximum transmittance and a minimum transmittance in a wavelength region of 1100 to 1250 nm, and $\lambda$(Tmax·30) is a wavelength showing the maximum transmittance Tmax·30, and $\lambda$(Tmin·30) is a wavelength showing the minimum transmittance Tmin·30.)

As used herein, "the spectral transmittance curve for the incident angle of "0" (zero) degree" refers to the spectral transmittance curve of light which is incident in vertical to a principal surface of the infrared cut filter, and "the spectral transmittance curve for the incident angle of 30 degrees" refers to the spectral transmittance curve of light which is incident with the angle of 30 degrees relative to the vertical direction to the principal surface of the infrared cut filter.

At the infrared cut filter 10A, high transmittance for the visible light is kept, and a fine infrared cut function, namely, a light shielding property in the near-infrared region is secured in a wide wavelength region without being affected by the incident angle, and it is possible to enable the reduction in size and thickness of a solid-state imaging device, or an imaging/display apparatus using the same, in addition, to manufacture at a low price with good yield.

In the above-stated requirements (i) and (ii), the average transmittance in the wavelength range of 450 to 600 nm is preferably 85% or more, more preferably 90% or more, and further preferably 95% or more to increase use efficiency of light.

Besides, the transmittance variations $D_0$ and $D_{30}$ are indexes indicating the cutting property at a wavelength band around 1200 nm, and the cutting property is fine as this value is smaller. In the present embodiment, both of the transmittance variations $D_0$ and $D_{30}$ are preferably 0.03 or less, and more preferably 0.02 or less.

Note that in the description, as for a transmittance in a specific wavelength region, when the transmittance is, for example, 90% or more, it means that the transmittance is not below 90% at all wavelengths in the wavelength region. Similarly, when the transmittance is, for example, 2% or less, the transmittance is not over 2% at all wavelengths in the wavelength region.

Hereinafter, the infrared absorbing layer and the selected wavelength cut layer which constitute the infrared cut filter are described.

(Infrared Absorbing Layer)

The infrared absorbing layer is made up of a transparent resin containing an infrared absorber.

As the infrared absorber, it is preferably used in which in an absorption spectrum of light in a wavelength range of 700 to 1300 nm measured by dissolving in a solvent whose refractive index ($n_d$) is less than 1.5, a maximum absorption wavelength (hereinafter, referred to as $\lambda_{max}$) is in 1100 to 1250 nm, and a shortest wavelength is 1000 nm or less in which an absorbance calculated while setting the absorbance at the $\lambda_{max}$ as one becomes 0.2. Hereinafter, the infrared absorber having a light absorption characteristic as stated above is denoted as an infrared absorber (A1). In the embodiment, one kind of the infrared absorber (A1) may be independently used, and two or more kinds may be used together.

Note that the refractive index ($n_d$) is a refractive index which is measured by using a light ray at a wavelength of 589 nm at 20° C. Besides, the solvent used here is a solvent in which the infrared absorber can be enough dissolved therein at around a room temperature to measure the absorbance.

In the description, an absorption spectrum of light in the wavelength range of 700 to 1300 nm which is measured by dissolving the infrared absorber in the solvent whose refractive index ($n_d$) is less than 1.5 is just referred to as the absorption spectrum of the infrared absorber. Further, in the following description, when it is referred to as the refractive index, it means a refractive index at 20° C. unless otherwise specified.

As the solvent used to measure the absorption spectrum of the infrared absorber, it is not particularly limited as long as it is one whose refractive index ($n_d$) is less than 1.5, and in which the infrared absorber can be enough dissolved at around the room temperature to measure the absorbance. In general, alcohols such as methanol and ethanol, ketones such as acetone, halogen-based solvents such as dichloromethane and chloroform, aromatic solvents such as toluene, alicyclic-based solvents such as cyclohexanone, and so on are used though it depends on a kind of the infrared absorber.

Figure 2:
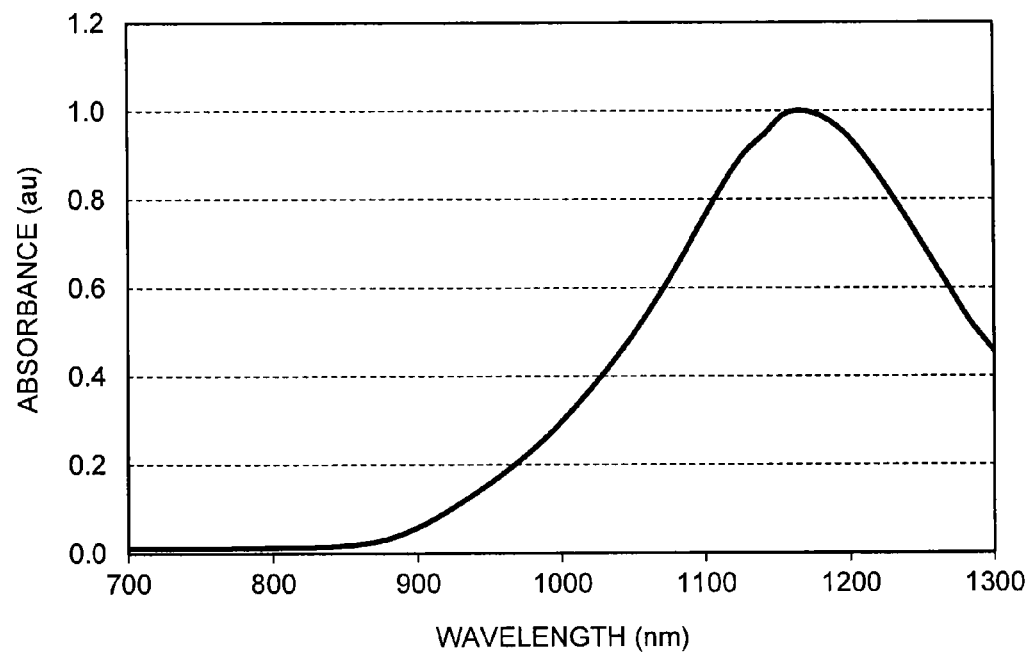
FIG. 2 is a view illustrating an example of an absorption spectrum of an infrared absorber used for the present invention.

In the infrared absorber (A1), the $\lambda_{max}$ in the absorption spectrum is preferably from 1100 to 1250 nm, and more preferably from 1130 to 1250 nm. Besides, it is preferable that the shortest wavelength is 1000 nm or less when the absorbance calculated while setting the absorbance at the $\lambda_{max}$ as one becomes 0.2, and it is more preferably 960 nm or less. Further, the infrared absorber (A1) is more preferably one in which a full width at half maximum of an absorption peak at the $\lambda_{max}$ is 150 nm or more in the absorption spectrum. Note that a molar absorbance coefficient of the infrared absorber (A1) is preferably large because a cutting performance becomes higher in addition to the above-stated requirements. Specifically, a molar absorbance coefficient $\in_m$ at around 1000 nm which is calculated from the absorption spectrum is preferably $1\times10^4$ or more. In FIG. 2, an example of an absorption spectrum of light in a wavelength range of 700 to 1300 nm of the infrared absorber (A1) which is suitably used in the embodiment is illustrated. One whose full width at half maximum at the above-stated absorption band is 150 nm or more is more preferable.

As a concrete example of the infrared absorber (A1) suitable for the embodiment, an absorber with a dithiolene structure expressed by the following general formula (F1) can be cited. The absorber with the dithiolene structure represented by the general formula (F1) is also referred to as an absorber (F1). It is the same as for the other absorbers.

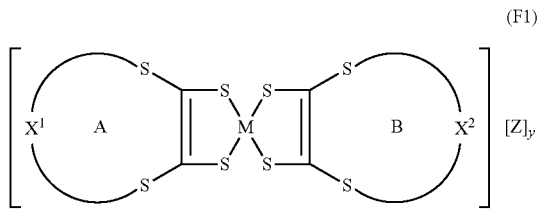

(F1)

In the formula (F1), M represents an metal atom, and there can be cited, for example, Ni, Pd, Pt, and so on. Among them, Pd and Pt generally shift the $\lambda_{max}$ toward a long-wavelength side compared to Ni, and therefore, they are preferable to obtain the infrared absorber (A1) whose $\lambda_{max}$ is in the wavelength region of 1100 to 1250 nm, on the other hand, they are rare metals, and expensive. Accordingly, Ni is preferable from viewpoints of easiness to obtain and economic efficiency.

$X^1$ represents a bivalent organic group constituting a heterocycle (ring A) together with a sulfur atom, and $X^2$ represents a bivalent organic group constituting a heterocycle (ring B) together with the sulfur atom. As the bivalent organic groups constituting $X^1$ and $X^2$, there can be cited the bivalent organic group of the following formula (I-1) or formula (I-2) in which one or more hydrogen atom(s) may be substituted by the following substituent group C or the like.

(I-1)

In the formula (I-1), n1 represents an integer from 4 to 14, and a part of —(CH$_2$)— may be a single bond between carbon atoms as —(CH)—.

(I-2)

In the formula (I-2), Y represents O, S, —S(=O)—, —S(=O)$_2$—, —C(=O)—, or —N(R$^1$)R$^2$— wherein each of R$^1$ and R$^2$ represents the hydrogen atom or the following substituent group C, and each of n2 and n3 represents an integer from "0" (zero) to 13.

As the substituent group C, there can be cited a halogen atom; a linear or branched saturated or unsaturated hydrocarbon group with a carbon number of 1 to 12 or saturated cyclic hydrocarbon group in which one or more hydrogen atom(s) may be substituted by the halogen atom, a hydroxyl group, an amino group, a carboxy group, a sulfo group, a nitro group, or a cyano group, there may be an oxygen atom, the —O—C(=O)— bond, or the —S(=O)$_2$— bond between the carbon atoms, and a part of —(CH$_2$)— may be a single bond between the carbon atoms as —(CH$_1$)— to include a saturated cyclic structure; and an aryl group with a carbon number of 6 to 18 or an alaryl group with a carbon number of 7 to 19 in which one or more hydrogen atom(s) may be substituted by the halogen atom, the hydroxyl group, the amino group, the carboxy group, the sulfo group, the nitro group, or the cyano group, and so on. As the halogen atom, a fluorine atom which is excellent in chemical stability is preferable.

In the description, the aryl group is a group which is bonded via the carbon atom which constitutes the an aromatic ring held by an aromatic compound, for example, a benzene ring, a naphthalene ring, biphenyl, a furan ring, a thiophene ring, a pyrrole ring, and so on. The alaryl group is a linear or branched saturated or unsaturated hydrocarbon group or a saturated cyclic hydrocarbon group substituted by one or more aryl group(s), which may contain a saturated cyclic structure.

A position of the substituent group C is not particularly limited, but the carbon number of the saturated or unsaturated hydrocarbon group is preferably 1 to 20, and more preferably 8 to 20 from a viewpoint of solubility to the transparent resin. Besides, as the saturated or unsaturated hydrocarbon group, the linear or branched or cyclic saturated hydrocarbon group which may contain the saturated cyclic structure is preferable, and the linear or branched saturated hydrocarbon group is more preferable from a viewpoint of convenience in synthesis.

Specifically, there can be cited the following.

—C(CH$_3$)$_2$—CH(CH$_3$)—

—C(CH$_3$)$_2$—CH$_2$—

—C(CH$_3$)$_2$—CH(C$_2$H$_5$)—

—C(CH$_3$)$_2$—CH$_2$—CH$_2$—

—C(CH$_3$)$_2$—CH$_2$—CH(CH$_3$)—

—C(CH$_3$)$_2$—CH(CH$_3$)—CH$_2$—

The aryl group is more preferably one which has only one benzene ring and with a carbon number of 6 to 11 from a viewpoint of solubility. Besides, the alaryl group is more preferably one which has only one benzene ring and with a carbon number of 7 to 12 from the viewpoint of solubility.

As the linear saturated hydrocarbon group, specifically, groups of the following formulas (1a), (1b) can be cited. As the branched saturated hydrocarbon group, specifically, groups of the following formulas (1c) to (1f) can be cited. Among them, it is preferable to have a branch at a terminal from a viewpoint of improvement in solubility for a resin. As the linear or branched saturated hydrocarbon group containing the saturated cyclic structure, specifically, groups of the following formulas (1h), (1i) can be cited, and as the saturated cyclic hydrocarbon group, specifically, a group of the following formula (1g) can be cited. A group containing a cyclohexyl ring is preferable as the group containing the saturated cyclic structure or the saturated cyclic hydrocarbon group from a viewpoint of increasing in heat resistance.

(1a)

(1b)

(1c)

(1d)

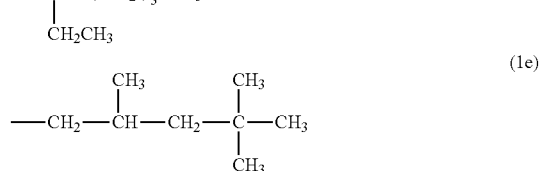

(1e)

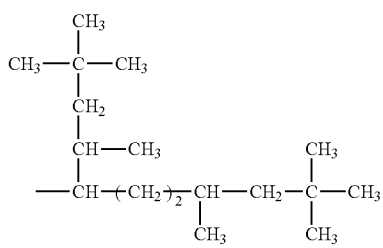
(1f)

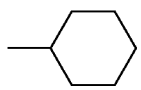
(1g)

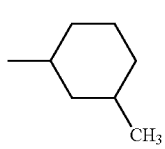
(1h)

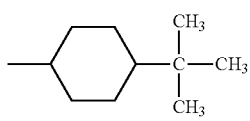
(1i)

Besides, as for the linear, branched or cyclic hydrocarbon group having the oxygen atoms or the —O—C(═O)— bond between the carbon atoms, a preferable carbon number is similar to the above. Note that the carbon atom having the —O—C(═O)— bond is not included in this carbon number. When the oxygen atoms are held, the number of the oxygen atoms is not particularly limited as long as it is smaller than the carbon number. As the cyclic hydrocarbon group having the oxygen atoms between the carbon atoms, there can be cited cyclic ether groups such as a tetrahydrofuranyl group, an oxetanyl group, a tetrahydropyranyl group.

As the hydrocarbon group having the oxygen atoms between the carbon atoms, specifically, groups of the following formulas (1j), (1k) can be cited. Besides, as the hydrocarbon group having the —O—C(═O)— bond, specifically, a group of the following formula (1l) can be cited.

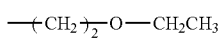
(1j)

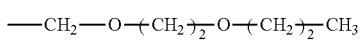
(1k)

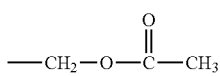
(1l)

An upper limit of the carbon number of the aryl group is more preferably 15, and further preferably 10 from a viewpoint of increasing in the solubility for the transparent resin of the infrared absorber (A1). As the aryl group as stated above, a lower saturated hydrocarbon group-substituted phenyl group is preferable. As the aryl group, specifically, groups of the following formulas (1o), (1p) can be cited. Note that the lower saturated hydrocarbon group in the description means the linear or branched saturated hydrocarbon group with the carbon number of 1 to 5.

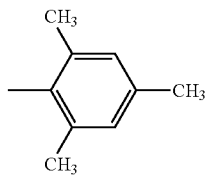
(1o)

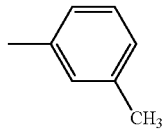
(1p)

An upper limit of the carbon number of the alaryl group is more preferably 15 from the viewpoint of increasing in the solubility for the transparent resin of the infrared absorber (A1). The unsubstituted or lower saturated hydrocarbon group-substituted phenyl group is preferable as the aryl group part of the alaryl group, and there may be two or more aryl groups. The saturated hydrocarbon group part of the alaryl group is preferably the linear or branched saturated hydrocarbon group with a carbon number of 1 to 9. The alaryl group may have the oxygen atoms between the carbon atoms. As the alaryl group as stated above, specifically, groups of the following formulas (1q) to (1t) can be cited.

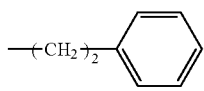
(1q)

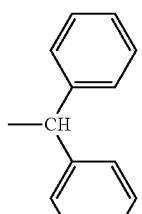
(1r)

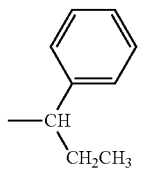
(1s)

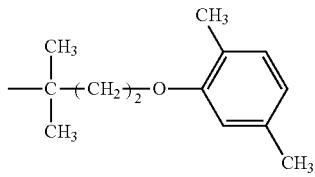
(1t)

In the general formula (F1), Z represents a compound represented by $DR^1R^2R^3R^4$ wherein D represents a nitrogen atom, a phosphorus atom, or a bismuth atom, and each of $R^1$, $R^2$, $R^3$ and $R^4$ represents a linear or branched alkyl group which may have the substituent group (for example, the fluorine atom, a chlorine atom, and so on), or the aryl group which may have the substituent group (for example, the fluorine atom, the chlorine atom, and so on), and y represents "0" (zero) or 1. As the alkyl group of each of $R^1$, $R^2$, $R^3$ and $R^4$, for example, a methyl group, an ethyl group, a butyl group, and so on can be cited independently.

The absorber represented by the general formula (F1) is the infrared absorber which has a plurality of dithiolene ligands at a center metal M of a molecular structure, and is a dithiolene complex which has a structure in which the heterocycle A and the heterocycle B are each bonded to each of the dithiolene structures via the sulfur atom, and is a compound having the light absorption characteristic of the infrared absorber.

In the general formula (F1), the right-and-left heterocycle A and heterocycle B bonded to the dithiolene structure may either be different structures or the same structure, but it is preferably the same structure from a viewpoint of easiness for manufacturing.

Examples in which the heterocycle A and the heterocycle B are the same structure are illustrated below. Every compound is a suitable compound as the infrared absorber of the embodiment. Every compound is able to constitute an ion pair by the counter cation (Z) as illustrated in the general formula (F1). As stated above, in each ion-paired compound, the absorption peak shifts toward the long-wavelength side and the absorption characteristic can be obtained over a wide wavelength range compared to a compound which is not ion-paired. Accordingly, it is preferable because a cut wavelength shift caused by the incident angle of light which remarkably arises especially in the cut/transmission boundary region over 1100 nm of the selected wavelength cut layer made up of the dielectric multilayer film is denied, and adverse effects of desensitization of the imaging device can be suppressed.

or the (ring B) which forms the heterocycles at the absorber (F1) are not formed can be used.

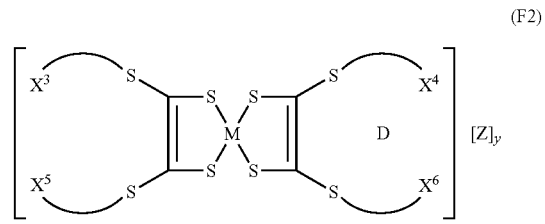

(F2)

Symbols in the general formula (F2) are the same as definitions and prescriptions in the general formula (F1) except $X^3$ to $X^6$, and it is allowed as long as the infrared absorber (A1) whose $\lambda_{max}$ is in the wavelength region of 1100 to 1250 nm can be obtained.

$X^3$ to $X^6$ represent an organic group which is bonded to the dithiolene structure via the sulfur atom. As the organic group constituting $X^3$ to $X^6$, there can be cited an aromatic group or the like whose terminal group is the alkyl group, an alkenyl group, an alkynyl group, a cycloalkyl group, a cycloalkenyl group, a cycloalkynyl group, or in a polycyclic (note that the ring number is 1 to 3) structure in which one or more hydrogen atom(s) may be substituted by the substituent group C or the like. $X^1$ or $X^2$ in the general formula (F1) may bond between the terminal group and the sulfur atom.

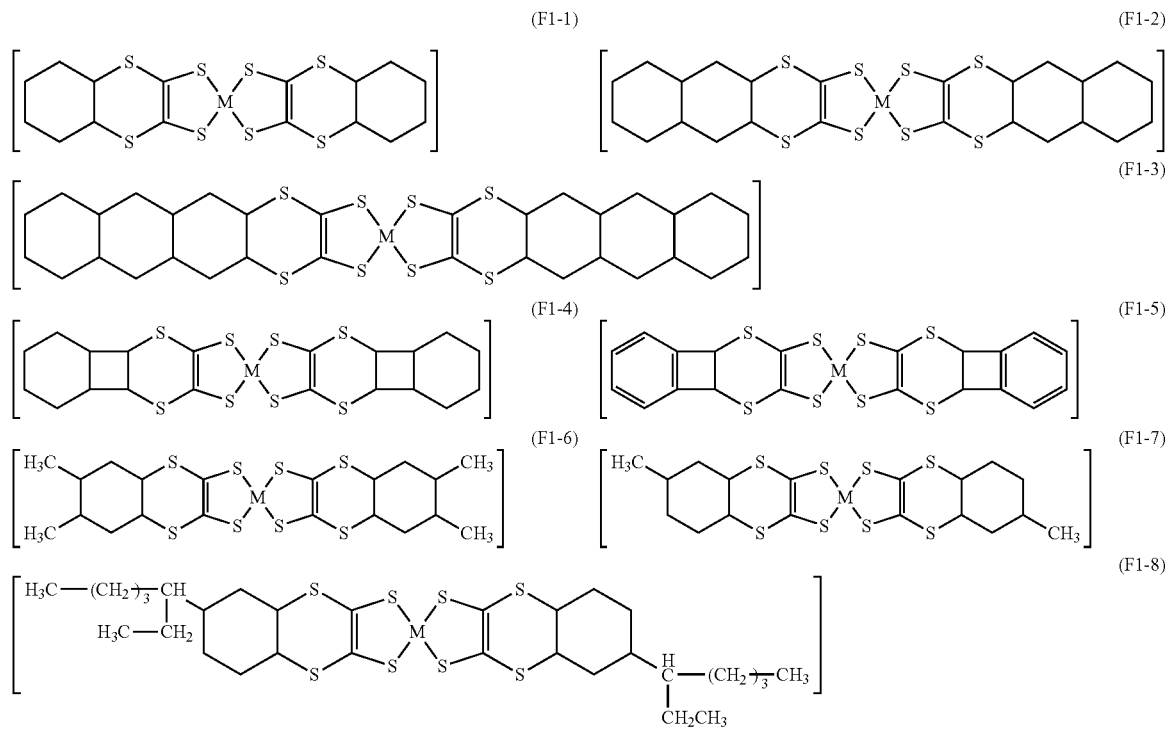

In the present embodiment, instead of the absorber (F1), or together with the absorber (F1), an absorber represented by the following general formula (F2) in which the (ring A)

Besides, as it is exemplified in the general formula (F3), it may have a structure in which one of two dithiolene cyclic structures is the heterocycle (ring A or ring B), and the other is a structure where the heterocycle is not formed.

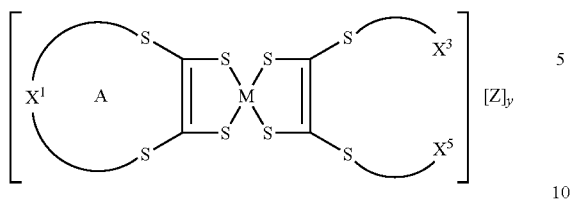
(F3)

As concrete examples of compounds having the structure as stated above, there can be cited ones represented by the following formulas (F3-1), (F3-2).

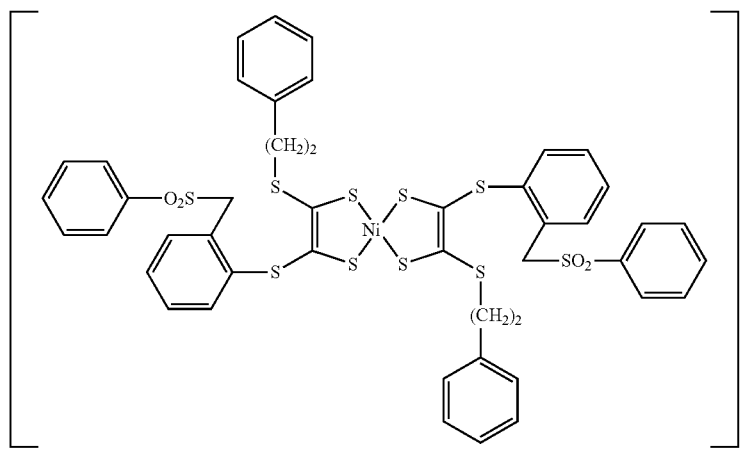
(F3-1)

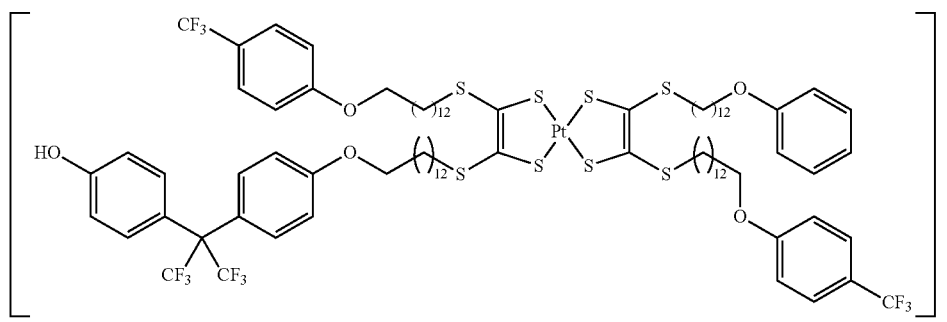
(F3-2)

In the embodiment, it is possible to use an infrared absorber expressed by the following general formula (F4) or (F5) as the infrared absorber. These infrared absorbers are preferably used as a combined component of the above-stated infrared absorber (A1).

-continued

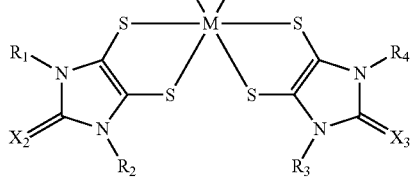
(F5)

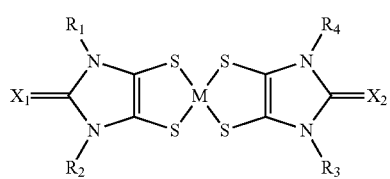
(F4)

In the above-stated formula, M represents Ni, Pd, Pt, Au, Ir, Fe, Zn, W, Cu, Mo, In, Mn, Co, Mg, V, Cr or Ti, each of $X_1$, $X_2$ and $X_3$ represents sulfur or oxygen, each of $R_1$, $R_2$, $R_3$, $R_4$, $R_5$ and $R_6$ represents hydrogen, an $NR_7R_8$ group, a $C_1$ to $C_{18}$ alkyl group which may be substituted, a $C_1$ to $C_{18}$ alkyl whose alkylene chain is interrupted by oxygen, a $C_1$ to $C_{18}$ alkenyl group which may be substituted, the aryl group which may be substituted, an arylalkyl group which may be substituted, or a heteroarylalkyl group which may be substituted, each of $R_7$ and $R_8$ represents the $C_1$ to $C_{18}$ alkyl group which may be substituted, the aryl group which may be substituted, the arylalkyl group which may be substituted, or the heteroarylalkyl group which may be substituted.

Note that the absorber (F1) and the absorber (F2) can be manufactured using known methods described in Aragoni. et al., J. Am. Chem. Soc. 121 (No. 30), 7098 (1999), Japanese Patent Application Laid-open No. 2008-88397, and so on. Besides, the absorber (F3) and the absorber (F4) can be manufactured using known methods described in Translated National Publication of Patent Application No. 2010-516823, Japanese Patent Application Laid-open No. 2008-88397, and so on. These documents are incorporated in the description by reference.

As the infrared absorber used in the embodiment, one in which in the absorption spectrum of light in the wavelength range of 700 to 1300 nm measured by dissolving in the solvent whose refractive index ($n_d$) is less than 1.5, the $\lambda_{max}$ is at 1100 to 1250 nm, and the shortest wavelength is 1000 nm or less when the absorbance calculated while setting the absorbance at the $\lambda_{max}$ as one becomes 0.2 is preferably used.

The absorption spectrum illustrated in FIG. 2 is the absorption spectrum of the absorber (F1-7), namely, the absorber of the formula (F1) wherein n1=6 in the X1 of the ring A and the X2 of the ring B, one hydrogen atom is the methyl group in the substituent group C in each of X1 and X2, D of the counter cation Z is P (phosphorus), and each of $R^1$, $R^2$, $R^3$ and $R^4$ is n-butyl, dissolved in chloroform.

As illustrated in FIG. 2, the $\lambda_{max}$ of the absorber (F1-7) is 1170 nm, and the shortest wavelength of two wavelengths where the absorbances calculated by correcting the absorbance at the $\lambda_{max}$ as one are 0.2 is 966 nm, which satisfies the above condition is satisfied. Using such infrared absorbers is preferable because a wide absorption region in the wavelength range of 1000 nm or more is obtained.

In the embodiment, it is possible to use an infrared absorber of which in the absorption spectrum of light in the wavelength range of 700 to 1300 nm measured in the solvent having a refractive index ($n_d$) of 1.5 or less, the maximum absorption wavelength $\lambda_{max}$ is in the region of 1100 nm or less (hereinafter, referred to as an infrared absorber (A2)). The infrared absorber (A2) is preferably used as a combined component of the infrared absorber (A1). In this case, a plurality of infrared absorbing layers may be provided while setting a layer containing the infrared absorber (A1) and a layer containing the infrared absorber (A2) as separated layers. It is preferable to set the layer containing the infrared absorber (A1) and the layer containing the infrared absorber (A2) as the separated layers from a viewpoint of stability of the infrared absorption ability.

Any one which has the light absorption characteristic, namely, any one whose $\lambda_{max}$ is in the range of 1100 nm or less in the absorption spectrum can be used as the infrared absorber (A2) without particularly being limited. It is possible to appropriately select and use one having the light absorption characteristic from among dyes such as a diimonium-based, a cyanine-based, a phthalocyanine-based, a naphthalocyanine-based, a dithiol metal complex-based, an azo-based, a polymethine-based, a phthalide-based, a naphtoquinone-based, an anthraquinone-based, an indophenol-based, a pyrylium-based, the thiopyrylium-based, a squarylium-based, a cloconium-based, a tetra-dehydrocholine-based, a triphenylmethane-based, and an aminium-based one which are generally known as the infrared absorber. On the infrared absorber (A2), one kind may be used independently, and two or more kinds may be used together.

As the infrared absorber (A2), the squarylium-based, the cyanine-based, the diimonium-based dyes, and so on are preferable, and the squarylium-based dye is more preferable from viewpoints that the absorption wavelength can be selected variously and freely, steepness of the absorption can be arbitrary designed, the absorption in the visible wavelength range is small, reliability is high, and so on.

An amount of the infrared absorber (A1) in the infrared absorbing layer is preferably within a range of 0.1 to 20 mass % relative to the transparent resin. The desired infrared absorption ability is obtained by setting the amount to be 0.1 mass % or more, and an interaction between the absorbers is suppressed, the stability of the infrared absorber (A1) becomes good, and lowering of the infrared absorption ability and increase in a haze value, and so on are suppressed by setting the amount to be 20 mass % or less. A range from 1 to 15 mass % is more preferable, and a range from 3 to 10 mass % is even more preferable from the above-stated viewpoints.

The infrared absorbing layer may contain various other components which are normally contained in the infrared absorbing layer within a range of not damaging the effects of the present invention in addition to the infrared absorber. As the other components, there can be cited, for example, the infrared absorbent, the color tone correcting dye, the leveling agent, the antistatic agent, the heat stabilizer, the light stabilizer, the antioxidant, the dispersing agent, the flame retardant, the lubricant, the plasticizer, the ultraviolet absorbent, and so on. As the ultraviolet absorbent, organic-based ultraviolet absorbents such as a benzotriazole-based absorbent, a benzophenone-based absorbent, a cyclic imino ester-based absorbent, and so on are preferable from a viewpoint of a transmitting property for the visible light.

In the embodiment, the refractive index ($n_d$) (wavelength: 589 nm) of the transparent resin which disperses the infrared absorber and various arbitrary components is preferably 1.47 or more, more preferably 1.5 or more, and even more preferably 1.6 or more. An upper limit of the refractive index of the transparent resin is not particularly limited, but approximately 1.72 can be exemplified from a viewpoint of easiness to obtain, or the like.

Besides, a glass transition temperature (Tg) of the transparent resin is preferably "0" (zero) to 380° C., more preferably 40 to 370° C., and further preferably 100 to 360° C. When the glass transition temperature (Tg) of the transparent resin is within a range of "0" (zero) to 380° C., it is possible to suppress deterioration and deformation caused by heat.

As the transparent resin, a polyester resin, a polyether resin, an acrylic resin, a polyolefin resin, a polycycloolefin resin, a polycarbonate resin, an ene-thiol resin, an epoxy resin, a polyamide resin, a polyurethane resin, a polystyrene resin, and so on can be used from viewpoints of solubility, transparency, and so on for the infrared absorber (A1). Among them, the acrylic resin, the polyester resin, the polycarbonate resin, or the cyclic olefin resin is preferable.

It is possible to adjust the refractive index of the transparent resin by adjusting the molecule structure of a raw material component, or the like. Specifically, a method can be used in which a specific structure is supplied to a main chain and a side chain of a polymer of the raw material component. The structure supplied into the polymer is not particularly limited, but for example, the fluorene skeletons expressed by the following formulas (B1), (B2) can be cited. Among these fluorene skeletons, 9,9-bisphenylfluorene skeleton expressed by the following formula (B2) is preferable from a point of capable of obtaining higher refractive index and heat resistance.

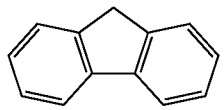
(B1)

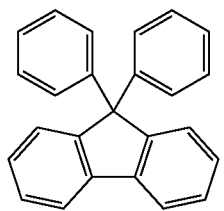
(B2)

As resins having the fluorene skeletons expressed by the above formulas (B1), (B2), the acrylic resin, the polycarbonate resin, the polyether resin, and the polyester resin are preferable. Besides, the fluorene skeleton may be contained in these resins by copolymerization. The polycarbonate resin and the polyester resin are preferable from viewpoints of heat resistance, easiness of obtaining, and transparency.

As the acrylic resin having the fluorene skeleton, there can be cited, for example, the acrylic resin obtained by polymerizing a raw material component containing 9,9-bisphenylfluorene derivative where a substituent group having a (meth)acryloyl group is each introduced at a terminal into at least two phenyl groups of 9,9-bisphenylfluorene. Note that in the description, "(meth)acryloyl . . . " is a generic of "methacryloyl . . . " and "acryloyl . . . ".

Besides, the acrylic resin obtained by polymerizing a compound in which the hydroxyl group is introduced into the 9,9-bisphenylfluorene derivative having the (meth)acryloyl group and an urethane(meth)acrylate compound may be used. As the urethane(meth)acrylate compound, there can be cited a compound obtained as a reaction product of a (meth)acrylate compound having the hydroxyl group and a polyisocyanate compound, and a compound obtained as a reaction product of the (meta)acrylate compound having the hydroxyl group, the polyisocyanate compound, and a polyol compound.

As the polyester resin where the fluorene skeleton is introduced, there can be cited, for example, the polyester resin where the 9,9-bisphenylfluorene derivative expressed by the following formula (B2-1) is introduced as the aromatic diol. In this case, a kind of the dicarboxylic acid to be reacted with the aromatic diol is not particularly limited. The polyester resin as stated above is suitably used as the transparent resin from viewpoints of a refractive index value and transparency in the visible light region.

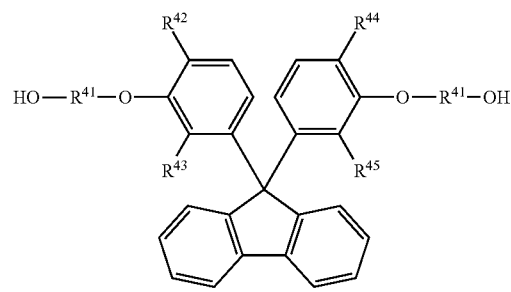
(B2-1)

In the formula, $R^{41}$ represents an alkylene group with a carbon number of 2 to 4, each of $R^{42}$, $R^{43}$, $R^{44}$ and $R^{45}$ represents hydrogen atom, a saturated hydrocarbon group with a carbon number of 1 to 7, or an aryl group with a carbon number of 6 to 7.

A commercial product may be used as the transparent resin. As the transparent resin, a resin is preferable in which the refractive index is 1.47 or more, and thermal degradation or thermal deformation do not occur when the dielectric multilayer film is formed by the high-temperature vapor deposition performed at a vapor-deposition temperature of 100° C. or more. As the resins as stated above, as the acrylic resin, there can be cited OGSOL EA-F5003 (manufactured by Osaka Gas Chemicals Co., Ltd., bland name, refractive index: 1.60), polymethylmethacrylate (refractive index: 1.49), polyisobutylmethacrylate (refractive index: 1.48) manufactured by Tokyo Chemical Industry Co., Ltd., and so on.

Besides, as the polyester resin, there can be cited OKPH4HT (refractive index: 1.64), OKPH4 (refractive index: 1.61), B-OKP2 (refractive index: 1.64) (hereinabove, all are manufactured by Osaka Gas Chemicals Co., Ltd., bland name), VYLON 103 (manufactured by TOYOBO Co., Ltd., bland name, refractive index: 1.55), as the polycarbonate resin, there can be cited LeXanML9103 (manufactured by SABIC, bland name, refractive index: 1.59), as the polymer alloy of polycarbonate and polyester, there can be cited Panlite AM-8 series (manufactured by Teijin Chemicals Ltd.), XYLEX 7507 (manufactured by SABIC, bland name), and so on.

Note that "transparent" in the present invention means a case when the spectral transmittance in the wavelength range of 400 to 600 nm is 60% or more.

The infrared absorbing layer can be formed by, for example, preparing a coating liquid by dissolving or dispersing the infrared absorber (A1), the transparent resin or the raw material component of the transparent resin, and each of optional components in a solvent, applying the coating liquid to a substrate to dry, and further curing if necessary.

As the solvent to dissolve or disperse the infrared absorber (A1), the transparent resin, and so on, it is not particularly limited as long as it is a dispersion medium capable of stably dispersing or a solvent capable of dissolving the infrared absorber (A1), the transparent resin or the raw material component of the transparent resin, and each of optional components. Note that in the description, a term of "solvent" is used as a concept including both of the dispersion medium and the solvent. As the solvent, there can be cited, for example, alcohols such as methanol, ethanol, n-propylalcohol, isopropylaclohol, n-butylalcohol, diacetonealcohol, ethylcellosolve, methylcellosolve, tridecylalcohol, cyclohexylalcohol, 2-methylcyclohexylalcohol, glycols such as ethyleneglycol, diethyleneglycol, triethyleneglycol, propyleneglycol, dipropyleneglycol, glycerine, ketones such as acetone, methylethylketone, methylisobutylketone, cyclopentanone, cyclohexanone, isophorone, diacetonealcohol, amides such as N,N-dimethylformamide, N,N-dimethylacetamide, sulfoxides such as dimethylsulfoxide, ethers such as tetrahydrofuran, dioxane, dioxolane, diethylether, ethyleneglycolmonomethylether, ethyleneglycol monoethylene ether, ethyleneglycolmonobutylether, diethyleneglycolmonomethylether, diethyleneglycolmonoethylether, diethyleneglycolbutylether, ethyleneglycolmonomethyletheracetate, ethyleneglycolmonoethyletheracetate, ethyleneglycolmonobutyletheracetate, esters such as methyl acetate, ethyl acetate, butyl acetate, aliphatic halogenated hydrocarbons such as chloroform, methylene chloride, dichloroethylene, carbon tetrachloride, trichloroethylene, the aromatic groups such as benzene, toluene, xylene, monochlorobenzene, dichlorobenzene, or aliphatic hydrocarbons such as n-hexane, n-heptane, cyclohexanoligroin, fluorine-based solvents such as tetrafluoropropylalcohol, pentafluoropropylalcohol, and so on. These solvents are able to be used as one kind independently, or two or more kinds by mixture.

An amount of the solvent is preferably 10 to 5000 parts by mass, and more preferably 30 to 2000 parts by mass relative to 100 parts by mass of the transparent resin or the raw material component of the transparent resin. Note that a content of a nonvolatile component (a solid content) in the coating liquid is preferably 2 to 50 mass %, more preferably 5 to 40 mass % relative to a whole quantity of the coating liquid.

It is possible that a surfactant is contained in the coating liquid. The surfactant is contained, and thereby, it is possible to improve an appearance, in particular, voids resulting from fine bubbles, dents caused by adhesion of foreign substances, or the like and shedding at a drying process. The surfactant is not particularly limited, and it is possible to use any known cation-based, anion-based, nonion-based surfactants, and so on.

A solid content concentration of the transparent resin, the infrared absorbent (A1), and so on in the coating liquid is generally within a range of 10 to 60 mass % though it depends on a coating method of the coating liquid. When the solid content concentration is too low, coating unevenness is easy to occur. On the other hand, when the solid content concentration is too high, a coating appearance is easy to be deteriorated.

When the coating liquid is coated, it is possible to use coating methods such as, for example, an immersion coating method, a cast coating method, a spray coating method, a spinner coating method, a bead coating method, a wire bar coating method, a blade coating method, a roller coating method, a curtain coating method, a slit-die coater method, a gravure coater method, a slit reverse coater method, a microgravure method, a inkjet method, or a comma coater method. In addition, it is possible to use a bar coater method, a screen printing method, a flexographic printing, and so on.

After the above-stated coating liquid is coated on the substrate, it is dried to thereby form the infrared absorbing layer. Known methods such as a heat drying and a hot-air drying can be used to dry. When the coating liquid contains the raw material component of the transparent resin, curing is further performed. It is possible to simultaneously perform the drying and the curing when the reaction is the thermal-curing, but in case of the photo-curing, the curing process is provided in addition to the drying. Besides, the infrared absorbing layer formed on a removable substrate is removed to be used for manufacturing an infrared cut filter.

The infrared absorbing layer is able to be manufactured into a film state by the extrusion molding depending on a kind of the transparent resin. A plurality of films manufactured as stated above may further be stacked to be integrated by the thermocompression bonding or the like.

A thickness of the infrared absorbing layer 12 is not particularly limited, and is appropriately defined in accordance with use thereof, namely, a disposed space in a used device, a required absorption characteristic, and so on. Normally, the thickness is 0.1 to 100 µm. When the thickness is less than 0.1 µm, there is a possibility that the infrared absorption ability cannot be enough exerted. Besides, when the thickness is over 100 µm flatness of the layer is lowered, and there is a possibility that variation may occur in an absorptance. The thickness of the infrared absorbing layer 12 is more preferably 1 to 50 µm. Within this range, it is possible to enable both the enough infrared absorption ability and the flatness of the layer.

Note that when the coating liquid is coated, it is possible to perform preprocessing for the substrate. As a preprocessing agent, there can be used aminosilanes such as γ-aminopropyltriethoxysilane, N-β-(aminoethyl)-γ-aminopropyltrimethoxysilane, N-β-(aminoethyl)-N'-β-(aminoethyl)-γ-aminopropyltriethoxysilane, γ-anilinopropyltrimethoxysilane, epoxysilanes such as γ-glycidoxypropyltrimethoxysilane, β-(3,4-epoxycyclohexyl)ethyltrimethoxysilane, vinylsilanes such as vinyltrimethoxysilane, N-β-(N-vinylbenzylaminoethyl)-γ-aminopropyltrimethoxysilane, γ-methacryloxypropyltrimethoxysilane, γ-chloropropyltrimethoxysilane, γ-mercaptopropyltrimethoxysilane, and so on. These may be used as one kind independently, or as two or more kinds by mixture.

(Selected Wavelength Cut Layer)

The selected wavelength cut layer preferably have a wavelength selecting characteristic transmitting the light in the visible region, and cutting the light with the wavelength other than a light shielding range of the infrared absorbing layer. Note that in this case, the light shielding range of the selected wavelength cut layer may include the light shielding range in the infrared wavelength region of the infrared absorbing layer.

The selected wavelength cut layer is made up of the dielectric multilayer film in which low refractive index dielectric films and high refractive index dielectric films are alternately stacked. It is thereby possible to exert a function to control the transmission and the cut of light in a specific wavelength range by using the interference of light. Herein, the low refractive index and the high refractive index mean that the low refractive index and the high refractive index are held relative to a refractive index of an adjacent layer.

The high refractive index dielectric film is not particularly limited as long as the refractive index is higher than the low refractive index dielectric film, but it has preferably the refractive index $(n_d)$ of 1.6 or more and more preferably 2.2 to 2.5 at the wavelength of 500 nm. As a material of the high refractive index dielectric film, there can be cited, for example, $Ta_2O_5$, $TiO_2$, $Nb_2O_5$, and so on. Among them, $TiO_2$ is preferable from viewpoints of reproducibility in film formability, the refractive index and so on, stability, or the like. On the other hand, the low refractive index dielectric film is not particularly limited as long as the refractive index is lower than the high refractive index dielectric film, but it has preferably the refractive index $(n_d)$ of less than 1.6, more preferably 1.45 or more and less than 1.55, and further preferably 1.45 to 1.47 at the wavelength of 500 nm. As a material of the low refractive index dielectric film, there can be cited, for example, $SiO_xN_y$, or the like. $SiO_2$ is preferable from viewpoints of reproducibility in the film formability, stability, economic efficiency, and so on.

In a spectral characteristic of the infrared cut filter of the embodiment, an ability to steeply change transmittance in a boundary wavelength region between a transmission light wavelength and a light-shielding wavelength is required. To obtain the ability steeply changing the transmittance in the boundary wavelength region between the transmission light wavelength and the light-shielding wavelength, the dielectric multilayer film preferably has the total number of stacks of the low refractive index dielectric films and the high refractive index dielectric films of 15 layers or more, more preferably 25 layers or more, and further preferably 30 layers or more. When the total number of stacks increases, a takt time at the manufacturing time becomes long, warpage or the like of the dielectric multilayer film is generated, or a film thickness of the dielectric multilayer film increases, and therefore, it is preferably 100 layers or less, more preferably 75 layers or less, and further preferably 60 layers or less. A stacking order of the low refractive index dielectric film and the high refractive index dielectric film is allowable as long as it is alternately stacked regardless of whether a first layer is the low refractive index dielectric film or the high refractive index dielectric film.

As the film thickness of the dielectric multilayer film, it is preferable as it is thinner from a viewpoint of reduction in thickness of the infrared cut filter while satisfying the preferable number of stacks. As the film thickness of the dielectric multilayer film, it is preferably 2 to 10 μm though it depends on the selected wavelength cutting characteristic. Note that when the dielectric multilayer film is used as an antireflection film, the film thickness thereof is preferably 0.1 to 1 μm. Besides, when the dielectric multilayer film is provided at each of surfaces of the transparent substrate and the infrared absorbing layer formed on the transparent substrate, there is a case when warpage is generated resulting from a stress of the dielectric multilayer film. A difference between the film thicknesses of the dielectric multilayer films formed on each of the surfaces is preferable to be small as much as possible so as to suppress the generation of the warpage based on forming the dielectric multilayer films to have the desired selected wavelength cutting characteristic.

When the dielectric multilayer film is formed, there can be used, for example, a CVD method, a sputtering method, a vacuum film-forming processes such as a vacuum vapor deposition method, a spray method, a wet film-forming processes such as the dip method, and so on.

The selected wavelength cut layer is used in combination with the infrared absorbing layer 12. Therefore, an optical characteristic of the selected wavelength cut layer 13 preferably satisfies the following requirements (iii-1) to (iii-3).
(iii-1) In a spectral transmittance curve for the incident angle of "0" (zero) degree, a transmittance in the wavelength range of 430 to 670 nm is 90% or more, and a transmittance in the wavelength range of λa to 1150 nm is 1% or less, wherein λa is a maximum wavelength whose transmittance is 1% in the wavelength range of 670 to 800 nm.
(iii-2) In a spectral transmittance curve for the incident angle of 30 degrees, a transmittance in the wavelength range of 430 to 650 nm is 90% or more, and a maximum wavelength whose transmittance is 1% in the wavelength range of λb to 1200 nm is 1100 nm or more, wherein λb is a maximum wavelength whose transmittance is 1% in the wavelength range of 670 to 800 nm).
(iii-3) A ratio $[T_{1200}(30)/T_{1200}(0)]$ between a transmittance $T_{1200}(30)$ at a wavelength of 1200 nm in the spectral transmittance curve for the incident angle of 30 degrees and a transmittance $T_{1200}(0)$ at a wavelength of 1200 nm in the spectral transmittance curve for the incident angle of "0" (zero) degree is 40 or less.

The requirement (iii-1) is satisfied, and thereby, it is possible to increase use efficiency of light in the visible light region.

Accordingly, the transmittance is preferable as it is higher, and is more preferably 93% or more.

Besides, the requirement (iii-2) is satisfied, and thereby, it is possible for the infrared cut filter 10A to cut the light in the long-wavelength range over 1200 nm. It is thereby possible to suppress the incidence of near-infrared light and to eliminate noises when, for example, it is used for a solid-state imaging device. It is preferable that a wavelength cutoff characteristic of the transmission/cutting from 670 to 800 nm is steep and incident angle dependence is small as much as possible. In general, the cutoff wavelength shifts to the short-wavelength side for approximately 30 to 80 nm resulting from the difference of the incident angles between, for example, "0" (zero) degree and 30 degrees, and therefore, it is often the case that a constitution of the dielectric multilayer film is reviewed, and the shift is eliminated by using a dye which has absorption at this band.

Note that in the selected wavelength cut layer, the transmittance of light in the ultraviolet wavelength region of 400 nm or less is more preferably 1% or less, and the transmittance of light at 410 nm or less is particularly preferably 1% or less.

Besides, the selected wavelength cut layer may cut the light in a predetermined wavelength region by one layer, or may cut the light in the predetermined wavelength region by combining a plurality of layers. Further, the selected wavelength cut layer may be disposed only at one side of the infrared absorbing layer, or may be disposed at both sides in accordance with use thereof. The number of selected wavelength cut layers to be disposed is not limited. One or more selected wavelength cut layer(s) may be disposed only at one side, or one or more selected wavelength cut layer(s) where each number is independent may be disposed at both sides. The stacking order of each component of the infrared cut filter is not particularly limited.

In the present invention, the constitution of the infrared cut filter is not particularly limited except to have the infrared absorbing layer and the selected wavelength cut layer. Accordingly, other components may be added. As the other components, there can be cited, for example, the transparent substrate which supports the infrared absorbing layer and the selected wavelength cut layer, inorganic fine particles controlling transmission and absorption of light in a specific wavelength range, and so on.

(Transparent Substrate)

A filter having a transparent substrate is preferable because heat resistance thereof increases. A shape of the transparent substrate is not particularly limited, and it may be a block state, a plate state or a film state. Besides, a constituting material of the transparent substrate is not particularly limited as long as it transmits the light in the visible wavelength region. There can be cited, for example, crystals such as crystalline quartz, lithium niobate, and sapphire, the glass, the polyester resins such as polyethyleneterephthalate (PET), and polybutyleneterephthalate (PBT), the polyolefin resins such as polyethylene, polypropylene, and ethylene-vinyl acetate copolymer, a norbornene resin, the acrylic resins such as polyacrylate, and polymethylmethacrylate, an urethane resin, a vinyl chloride resin, a fluorocarbon resin, the polycarbonate resin, a polyvinylbutyral resin, a polyvinylalcohol resin, and so on.

These transparent substrates are preferably composed of inorganic substances from an optical characteristic as an optical filter, a viewpoint of stability in shape relating to long term reliability of mechanical characteristics, or the like, a handling ability at the filter manufacturing time, and so on. In particular, the glass which is able to correspond to reduction in a substrate thickness into a desired thickness is preferable including a cost thereof. A kind of the glass is not particularly limited, and there can be cited the normal soda lime glass, the borosilicate glass, the non-alkaline glass, the quartz glass, and so on. Further, for example, an absorption type glass in which CuO or the like is added to a fluorophosphate-based glass, a phosphate-based glass, and so on having the absorption characteristic for the wavelength in the ultraviolet region and/or near-infrared region is preferable because it is possible to suppress a load for a near-infrared absorbing layer and a selected wavelength cut layer when the light shielding property in the near infrared wavelength region from 1100 nm or more to over 1200 nm is required.

When the transparent substrate is the glass, it is possible to appropriately select and use characteristics such as presence/absence of an alkaline component, and a size of a linear expansion coefficient in consideration of a device to be used, a place to be disposed, and so on from among transparent materials in the visible range. The borosilicate glass is preferable because it is easy to process, and generations of scratches, foreign substances, and so on at an optical surface can be suppressed. The non-alkaline glass which does not contain the alkaline component is advantageous in a point that reliability can be supplied to the infrared cut filter because adhesiveness, weather resistance, and so on thereof are high. The soda lime glass is advantageous in points of economic efficiency, easiness to obtain, and chemical strengthening, and is particularly preferable because it is equal to the non-alkaline glass in a point that it is possible to supply high reliability to the infrared cut filter owing to existence of a base layer which prevents alkaline elution.

When the transparent substrate is a glass plate, a thickness of the glass plate is preferably within a range of 0.03 to 5 mm from viewpoints of reduction in size and thickness of a device, suppressing damages at a handling time, and so on, and more preferably within a range of 0.05 to 1 mm from viewpoints of reduction in weight and strengthening.

Besides, the crystals such as crystalline quartz, lithium niobate, and sapphire are used as a material of a low-pass filter and a wavelength plate to reduce moire and false color in imaging apparatuses such as a digital still camera, a digital video camera, a monitoring camera, an onboard camera, and a web camera. When these crystals are used as the material of the transparent substrate, it is preferable from viewpoints of capable of supplying functions as the low-pass filter and the wavelength plate to the infrared cut filter according to the embodiment, and enabling further reduction in size and thickness of the imaging apparatus.

(Inorganic Fine Particles)

As concrete examples of the inorganic fine particles, there can be cited ITO (indium tin oxides) particles, ATO (antimony-doped tin oxides) particles, cesium tungstate particles, lanthanum boride, and so on. Among them, ITO fine particles, cesium tungstate fine particles have high transmittance of light in the visible wavelength region, and have the light absorption property for a wide range including the infrared wavelength region over 1200 nm, and therefore, it is particularly preferable when the cutting property of light in the infrared wavelength region is required.

A number average aggregated particle size of the above-stated inorganic fine particles is preferably 5 to 200 nm, more preferably 5 to 100 nm, and further preferably 5 to 70 nm from viewpoints of suppressing scattering, and maintaining transparency. In the description, the number average aggregated particle size means a value measuring a dispersion liquid for particle size measurement in which specimen fine particles are dispersed in dispersion media such as water and alcohol by using a dynamic light scattering particle size distribution analyzer.

Figure 4:
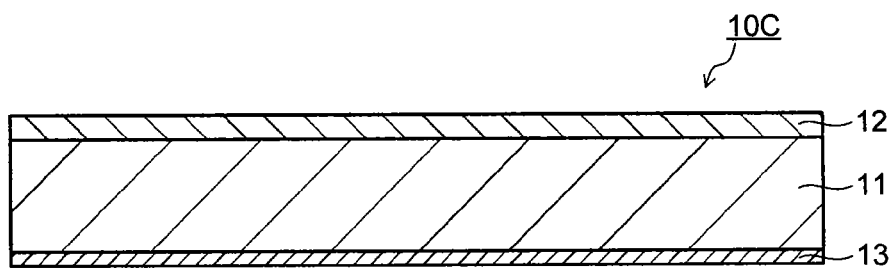
FIG. 4 is a sectional view schematically illustrating a modification example of the infrared cut filter according to the embodiment of the present invention.
Figure 5:
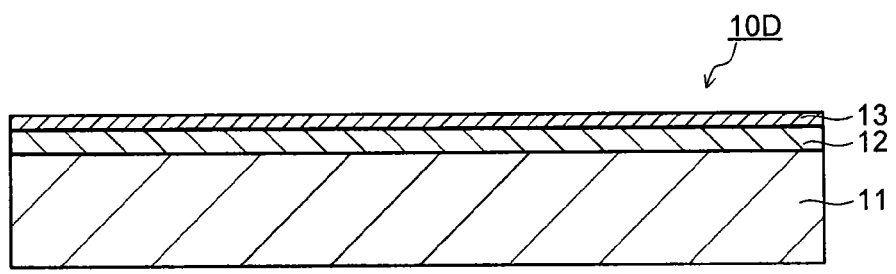
FIG. 5 is a sectional view schematically illustrating a modification example of the infrared cut filter according to the embodiment of the present invention.

Hereinafter, modification examples of the embodiment are described. For example, there may be a constitution in which selected wavelength cut layers 13a, 13b are included at both surfaces of the infrared absorbing layer 12 as an infrared cut filter 10B illustrated in FIG. 3. There may be a constitution in which the infrared absorbing layer 12 is included at one principal surface of the transparent substrate 11, and the selected wavelength cut layer 13 is included at the other principal surface as an infrared cut filter 10C illustrated in FIG. 4. Besides, there may be a constitution in which the infrared absorbing layer 12 and the selected wavelength cut layer 13 are included at one principal surface of the transparent substrate 11 as an infrared cut filter 10D illustrated in FIG. 5. Besides, there may be a constitution in which the infrared absorbing layer 12 is included at one principal surface of the transparent substrate 11, and the selected wavelength cut layers 13a, 13b are included at both surfaces thereof as an infrared cut filter 10E illustrated in FIG. 6. Besides, there may be a constitution in which infrared absorbing layers 12a, 12b are included at both principal surfaces of the transparent substrate 11, and the selected wavelength cut layers 13a, 13b are further included at both surfaces thereof as an infrared cut filter 10F illustrated in FIG. 7.

Figure 6:
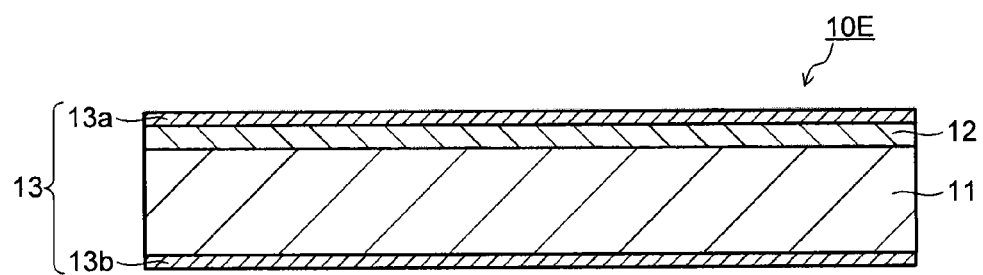
FIG. 6 is a sectional view schematically illustrating a modification example of the infrared cut filter according to the embodiment of the present invention.
Figure 7:
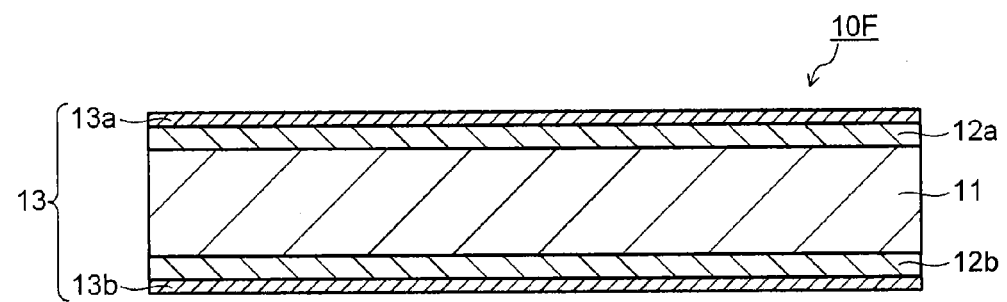
FIG. 7 is a sectional view schematically illustrating a modification example of the infrared cut filter according to the embodiment of the present invention.

In the infrared cut filters 10E, 10F having the constitutions illustrated in FIG. 6 and FIG. 7, as the selected wavelength cut layers 13 formed at both principal surfaces of the transparent substrate 11 where the infrared absorbing layers 12, 12a, 12b are formed, there can be cited a layer or the like which absorbs or reflects light at a specific wavelength which contains at least one kind selected from a near-infrared absorbent to an infrared absorbent, a color tone correcting dye, and an ultraviolet absorbent, in addition to the dielectric multilayer film.

Figure 3:
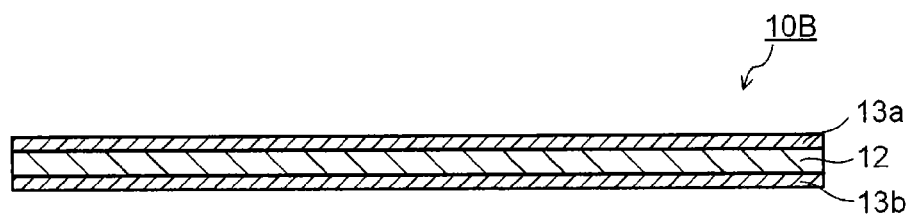
FIG. 3 is a sectional view schematically illustrating a modification example of the infrared cut filter according to the embodiment of the present invention.

In the infrared cut filters 10B, 10E, 10F illustrated in FIG. 3, FIG. 6 and FIG. 7, the two layers of the selected wavelength cut layers 13a, 13b to be combined may be the same or different. When two layers of the selected wavelength cut layers 13a, 13b are separately constituted as a first selected wavelength cut layer 13a and a second selected wavelength cut layer 13b whose optical characteristics are different, the selected wavelength cutting characteristics and an alignment sequence are appropriately adjusted. Besides, in the infrared cut filter 10F having the constitution illustrated in FIG. 7, when two layers of the infrared absorbing layers 12a, 12b are constituted as a first infrared absorbing layer 12a and a second infrared absorbing layer 12b whose optical characteristics are different, an alignment sequence is appropriately adjusted in consideration of an absorption wavelength band and an absorption constant.

From this viewpoint, as a positional relationship of the first infrared absorbing layer 12a, the second infrared absorbing layer 12b, the first selected wavelength cut layer 13a, and the second selected wavelength cut layer 13b, specifically, the following positional relationships can be cited. Note that the first infrared absorbing layer 12a, the second infrared absorbing layer 12b, the first selected wavelength cut layer 13a, and the second selected wavelength cut layer 13b are respectively abbreviated to "12a", "12b", "13a", and "13b".

(1A): 13a/12a/12b/13b
(1B): 13a/12b/12a/13b
(2A): 13a/13b/12a/12b
(2B): 13a/13b/12b/12a
(2C): 13a/12a/13b/12b
(2D): 13a/12b/13b/12a
(2E): 13b/13a/12a/12b
(2F): 13b/13a/12b/12a
(2G): 13b/12a/13a/12b
(2H): 13b/12b/13a/12a
(3A): 12a/13a/13b/12b
(3B): 12a/13b/13a/12b

The transparent substrate 11 can be disposed at a front face, intermediate, a rear face of each constitution. In each of modes of (2A) to (2H) and (3A) to (3B), when the first infrared absorbing layer 12a or the second infrared absorbing layer 12b is at an uppermost surface, it is preferable to provide an anti-reflection layer on the infrared absorbing layer because a visible light transmittance loss occurs on the infrared absorbing layer caused by reflection.

A direction when the infrared cut filter constituted as stated above is provided at the imaging apparatus or the like is appropriately selected according to a design thereof.

As the anti-reflection layer, there can be cited a dielectric multilayer film, an intermediate refractive index medium, a moth-eye structure whose refractive index gradually changes, and so on. Among them, it is preferable to use the dielectric multilayer film from viewpoints of optical efficiency and productivity. The dielectric multilayer film used as the anti-reflection layer is able to be obtained by alternately stacking the low refractive index dielectric film and the high refractive index dielectric film as same as the dielectric multilayer film used as the selected wavelength cut layer 13.

The filter is able to be used as an NIR filter of the imaging apparatuses such as the digital still camera, the digital video camera, the monitoring camera, the onboard camera, the web camera, an automatic exposure meter, and so on.

The filter is suitably used in the imaging apparatuses, and disposed between an imaging lens and a solid-state imaging device, between the imaging lens and a window member of a camera, or at both of them. Besides, as stated above, the filter may have a constitution in which the imaging lens and the window member of the camera are made to be the transparent substrates, and the infrared absorbing layer is provided at one principal surface thereof.

The filter may be used by directly adhering to the solid-state imaging device of the imaging apparatuses, the light-receiving element of the automatic exposure meter, the imaging lens, and so on via an adhesive layer. Further, the filter is able to be used by directly adhering to a glass window and a lamp of a vehicle (automobile or the like) via the adhesive layer.

EXAMPLES

Next, the present invention is further concretely described by examples, but the present invention is not limited to the examples. Note that the spectral transmittance curves of the infrared cut filter, the dielectric multilayer file, and so on in the examples and comparative examples were measured by using an ultraviolet-visible spectrophotometer (manufactured by SHIMADZU Corporation, SolidSpec-3700DUV).

Example 1

A dithiolene complex (in an absorption spectrum of light in a wavelength range of 700 to 1300 nm measured by dissolving in toluene, $\lambda_{max}$ is 1168 nm, a shortest wavelength when an absorbance calculated by setting the absorbance at the $\lambda_{max}$ as one becomes 0.2 is 891 nm) expressed by the formula (F1-6) was mixed in a 15 mass % cyclohexanone solution of the polyester resin (manufactured by Osaka Gas Chemicals Co., Ltd., brand name: B-OKP2) at a ratio of 4.0 parts by mass to 100 parts by mass of the polyester resin, followed by enough stirring and dissolving, to prepare a coating liquid A.

A squarylium dye ($\lambda_{max}$=697 nm (toluene)) expressed by the following formula was mixed in a 50 mass % tetrahydrofuran solution of the acrylic resin (manufactured by Osaka Gas Chemicals Co., Ltd., brand name: OGSOL EA-F5003) at a ratio of 0.25 parts by mass to 100 parts by mass of the acrylic resin, followed by enough stirring and dissolving, to prepare a coating liquid B.

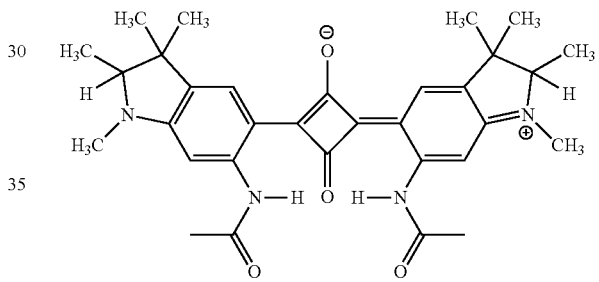

The coating liquid B was coated on one principal surface of a PTFE (polytetrafluoroethylene) substrate by a die coating method, heated at 130° C. for 60 minutes to dry, and thereafter, ultraviolet light having a wavelength of 365 nm was irradiated at 360 mJ/cm² on the coating film to be cured, to form an infrared absorbing layer B with a thickness of 10.0 μm.

Next, the coating liquid A was coated on a principal surface of the infrared absorbing layer B by the die coating method, dried under reduced pressure (approximately 670 Pa) at a room temperature for five minutes, and thereafter, heated at 90° C. for 30 minutes. This process from the coating to the heating was repeated again, and thereafter, it was heated at 150° C. for 15 minutes, to form an infrared absorbing layer A with a thickness of 10.8 μm. After that, it was peeled off from the PTFE substrate to obtain an infrared absorbing layer with a thickness of 21 μm.

After that, silica ($SiO_2$; refractive index of 1.45 (wavelength of 550 nm)) layers and titania ($TiO_2$; refractive index of 2.32 (wavelength of 550 nm)) layers were alternately stacked by the sputtering method at an infrared absorbing layer A side to form a dielectric multilayer film A (42 layers) made up of a constitution as illustrated in Table 1.

On the infrared absorbing layer B, the silica ($SiO_2$; refractive index of 1.45 (wavelength of 550 nm)) layers and the titania ($TiO_2$; refractive index of 2.32 (wavelength of 550 nm)) layers were alternately stacked by the sputtering method to form an anti-reflection film (11 layers) made up of a constitution as illustrated in Table 2, and an infrared cut filter was obtained.

Example 2

The coating liquid A and the coating liquid B were prepared as same as the example 1. The coating liquid A was coated on one principal surface of a glass substrate by the die coating method, dried under reduced pressure (approximately 670 Pa) at the room temperature for five minutes, and thereafter, heated at 90° C. for 30 minutes. This process from the coating to the heating was repeated again, and thereafter, it was heated at 150° C. for 15 minutes, to form the infrared absorbing layer A with the thickness of 10.8 μm. A substrate made up of a soda glass (manufactured by SCHOTT AG, brand name D263) with a thickness of 1.0 mm was used for the glass substrate.

Next, on the infrared absorbing layer A, the silica ($SiO_2$; refractive index of 1.45 (wavelength of 550 nm)) layers and the titania ($TiO_2$; refractive index of 2.32 (wavelength of 550 nm)) layers were alternately stacked by the sputtering method to form the dielectric multilayer film A (42 layers) made up of the constitution as illustrated in Table 1.

Next, the coating liquid B was coated on the other principal surface (a surface opposite to the surface where the infrared absorbing layer A and the dielectric multilayer film A were formed) of the glass substrate by a die coating method, heated at 130° C. for 60 minutes to be dried, and thereafter, the ultraviolet light having the wavelength of 365 nm was irradiated at 360 mJ/cm$^2$ on the coating film to be cured, to form the infrared absorbing layer B with the thickness of 10.0 μm.

After that, on the infrared absorbing layer B, the silica ($SiO_2$; refractive index of 1.45 (wavelength of 550 nm)) layers and the titania ($TiO_2$; refractive index of 2.32 (wavelength of 550 nm)) layers were alternately stacked by the sputtering method to form the anti-reflection film (11 layers) made up of the constitution as illustrated in Table 2, and an infrared cut filter was obtained.

Example 3

A coating liquid was prepared as same as the case of the coating liquid A in the example 1 except that a dithiolene complex (in an absorption spectrum measured by dissolving in toluene, $\lambda_{max}$ is 1170 nm, a shortest wavelength when absorbance calculated by setting the absorbance at the $\lambda_{max}$ as one becomes 0.2 is 966 nm) expressed by the formula (F1-7) was used instead of the dithiolene complex expressed by the formula (F1-6).

This coating liquid was coated on one principal surface of a glass substrate by a die coating method, dried under reduced pressure (approximately 670 Pa) at the room temperature for five minutes, and thereafter, heated at 90° C. for 30 minutes. This process from the coating to the heating was repeated again, and thereafter, it was heated at 150° C. for 15 minutes, to form an infrared absorbing layer with a thickness of 4.7 μm. A substrate made up of a fluorophosphate glass containing CuO (manufactured by AGC Techno Glass Co., Ltd., brand name NF-50T) with a thickness of 0.35 mm was used for the glass substrate.

Next, on the other principal surface of the glass substrate (a surface opposite to the surface where the infrared absorbing layer was formed), the silica ($SiO_2$; refractive index of 1.45 (wavelength of 550 nm)) layers and the titania ($TiO_2$; refractive index of 2.32 (wavelength of 550 nm)) layers were alternately stacked by the sputtering method to form a dielectric multilayer film (48 layers) made up of a constitution as illustrated in Table 3. After that, on the infrared absorbing layer, a three-layer anti-reflection film made up of magnesium fluoride, zirconia, and alumina as illustrated in Table 4 was formed by the common procedure to obtain an infrared cut filter.

TABLE 1

|  | Material | Physical film thickness (nm) |
|---|---|---|
| 1st layer | $TiO_2$ | 8 |
| 2nd layer | $SiO_2$ | 201 |
| 3rd layer | $TiO_2$ | 97 |
| 4th layer | $SiO_2$ | 153 |
| 5th layer | $TiO_2$ | 88 |
| 6th layer | $SiO_2$ | 120 |
| 7th layer | $TiO_2$ | 84 |
| 8th layer | $SiO_2$ | 148 |
| 9th layer | $TiO_2$ | 85 |
| 10th layer | $SiO_2$ | 147 |
| 11th layer | $TiO_2$ | 84 |
| 12th layer | $SiO_2$ | 147 |
| 13th layer | $TiO_2$ | 84 |
| 14th layer | $SiO_2$ | 147 |
| 15th layer | $TiO_2$ | 84 |
| 16th layer | $SiO_2$ | 147 |
| 17th layer | $TiO_2$ | 86 |
| 18th layer | $SiO_2$ | 147 |
| 19th layer | $TiO_2$ | 87 |
| 20th layer | $SiO_2$ | 152 |
| 21th layer | $TiO_2$ | 91 |
| 22th layer | $SiO_2$ | 164 |
| 23th layer | $TiO_2$ | 104 |
| 24th layer | $SiO_2$ | 183 |
| 25th layer | $TiO_2$ | 107 |
| 26th layer | $SiO_2$ | 170 |
| 27th layer | $TiO_2$ | 100 |
| 28th layer | $SiO_2$ | 179 |
| 29th layer | $TiO_2$ | 113 |
| 30th layer | $SiO_2$ | 192 |
| 31th layer | $TiO_2$ | 115 |
| 32th layer | $SiO_2$ | 193 |
| 33th layer | $TiO_2$ | 117 |
| 34th layer | $SiO_2$ | 194 |
| 35th layer | $TiO_2$ | 115 |
| 36th layer | $SiO_2$ | 192 |
| 37th layer | $TiO_2$ | 115 |
| 38th layer | $SiO_2$ | 192 |
| 39th layer | $TiO_2$ | 29 |
| 40th layer | $SiO_2$ | 2 |
| 41th layer | $TiO_2$ | 83 |
| 42th layer | $SiO_2$ | 95 |

TABLE 2

|  | Material | Physical film thickness (nm) |
|---|---|---|
| 1st layer | $SiO_2$ | 48 |
| 2nd layer | $TiO_2$ | 11 |
| 3rd layer | $SiO_2$ | 62 |
| 4th layer | $TiO_2$ | 22 |
| 5th layer | $SiO_2$ | 53 |
| 6th layer | $TiO_2$ | 16 |
| 7th layer | $SiO_2$ | 121 |
| 8th layer | $TiO_2$ | 9 |
| 9th layer | $SiO_2$ | 45 |
| 10th layer | $TiO_2$ | 108 |
| 11th layer | $SiO_2$ | 85 |

TABLE 3

| | Material | Physical film thickness (nm) |
|---|---|---|
| 1st layer | $TiO_2$ | 16.12 |
| 2nd layer | $SiO_2$ | 39.32 |
| 3rd layer | $TiO_2$ | 127.72 |
| 4th layer | $SiO_2$ | 188.93 |
| 5th layer | $TiO_2$ | 119.46 |
| 6th layer | $SiO_2$ | 194.72 |
| 7th layer | $TiO_2$ | 121.06 |
| 8th layer | $SiO_2$ | 194.34 |
| 9th layer | $TiO_2$ | 123.53 |
| 10th layer | $SiO_2$ | 193.54 |
| 11th layer | $TiO_2$ | 120.88 |
| 12th layer | $SiO_2$ | 193.97 |
| 13th layer | $TiO_2$ | 123.53 |
| 14th layer | $SiO_2$ | 190.54 |
| 15th layer | $TiO_2$ | 119.99 |
| 16th layer | $SiO_2$ | 187.49 |
| 17th layer | $TiO_2$ | 111.49 |
| 18th layer | $SiO_2$ | 173.77 |
| 19th layer | $TiO_2$ | 107.76 |
| 21th layer | $TiO_2$ | 117.39 |
| 22th layer | $SiO_2$ | 185.76 |
| 23th layer | $TiO_2$ | 115.89 |
| 24th layer | $SiO_2$ | 181.04 |
| 25th layer | $TiO_2$ | 107.56 |
| 26th layer | $SiO_2$ | 163.06 |
| 27th layer | $TiO_2$ | 92.23 |
| 28th layer | $SiO_2$ | 148.20 |
| 29th layer | $TiO_2$ | 88.42 |
| 30th layer | $SiO_2$ | 148.55 |
| 31th layer | $TiO_2$ | 87.29 |
| 32th layer | $SiO_2$ | 144.13 |
| 33th layer | $TiO_2$ | 83.80 |
| 34th layer | $SiO_2$ | 143.34 |
| 35th layer | $TiO_2$ | 85.53 |
| 36th layer | $SiO_2$ | 145.17 |
| 37th layer | $TiO_2$ | 85.96 |
| 38th layer | $SiO_2$ | 143.21 |
| 39th layer | $TiO_2$ | 84.12 |
| 40th layer | $SiO_2$ | 144.86 |
| 41th layer | $TiO_2$ | 84.59 |
| 42th layer | $SiO_2$ | 144.29 |
| 43th layer | $TiO_2$ | 86.89 |
| 45th layer | $TiO_2$ | 87.75 |
| 46th layer | $SiO_2$ | 150.50 |
| 47th layer | $TiO_2$ | 86.82 |
| 48th layer | $SiO_2$ | 70.15 |

TABLE 4

| | Material | Physical film thickness (nm) |
|---|---|---|
| 1st layer | $Al_2O_3$ | 76.32 |
| 2nd layer | $ZrO_2$ | 125.22 |
| 3rd layer | $MgF_2$ | 91.9 |

Comparative Example 1

An infrared cut filter was obtained as same as the example 3 except that the infrared absorbing layer was not formed.

Comparative Example 2

An infrared cut filter was obtained as same as the example 2 except that the infrared absorbing layer A was not formed.

Comparative Example 3

An infrared cut filter was obtained as same as the example 2 except that a dielectric multilayer film having a constitution illustrated in Table 5 was formed on one principal surface of a glass substrate via the infrared absorbing layer A, and a dielectric multilayer film having a constitution illustrated in Table 6 was formed on the other principal surface of the glass substrate without forming the infrared absorbing layer B.

TABLE 5

| | Material | Physical film thickness (nm) |
|---|---|---|
| 1st layer | $TiO_2$ | 10 |
| 2nd layer | $SiO_2$ | 41 |
| 3rd layer | $TiO_2$ | 103 |
| 4th layer | $SiO_2$ | 156 |
| 5th layer | $TiO_2$ | 86 |
| 6th layer | $SiO_2$ | 149 |
| 7th layer | $TiO_2$ | 85 |
| 8th layer | $SiO_2$ | 146 |
| 9th layer | $TiO_2$ | 83 |
| 10th layer | $SiO_2$ | 146 |
| 11th layer | $TiO_2$ | 83 |
| 12th layer | $TiO_2$ | 145 |
| 13th layer | $SiO_2$ | 84 |
| 14th layer | $TiO_2$ | 147 |
| 15th layer | $SiO_2$ | 83 |
| 16th layer | $TiO_2$ | 146 |
| 17th layer | $SiO_2$ | 88 |
| 18th layer | $TiO_2$ | 150 |
| 19th layer | $SiO_2$ | 89 |
| 20th layer | $TiO_2$ | 158 |
| 21th layer | $SiO_2$ | 96 |
| 22th layer | $TiO_2$ | 85 |

TABLE 6

| | Material | Physical film thickness (nm) |
|---|---|---|
| 1st layer | $TiO_2$ | 10 |
| 2nd layer | $SiO_2$ | 33 |
| 3rd layer | $TiO_2$ | 103 |
| 4th layer | $SiO_2$ | 168 |
| 5th layer | $TiO_2$ | 97 |
| 6th layer | $SiO_2$ | 166 |
| 7th layer | $TiO_2$ | 102 |
| 8th layer | $SiO_2$ | 180 |
| 9th layer | $TiO_2$ | 108 |
| 10th layer | $SiO_2$ | 180 |
| 11th layer | $TiO_2$ | 107 |
| 12th layer | $SiO_2$ | 182 |
| 13th layer | $TiO_2$ | 110 |
| 14th layer | $SiO_2$ | 186 |
| 15th layer | $TiO_2$ | 113 |
| 16th layer | $SiO_2$ | 188 |
| 17th layer | $TiO_2$ | 114 |
| 18th layer | $SiO_2$ | 187 |
| 19th layer | $TiO_2$ | 113 |
| 20th layer | $SiO_2$ | 96 |

Comparative Example 4

An infrared cut filter was obtained as same as the example 3 except that a coating liquid was used in which a dithiolene complex (maximum absorption wavelength $\lambda_{max}$ (chloroform solvent=1010 nm) expressed by the following formula was mixed in a 15 mass % cyclohexane solution of the polyester resin (manufactured by Osaka Gas Chemicals Co., Ltd., brand name: B-OKP2) at a ratio of 4.0 parts by mass to 100 parts by mass of the polyester resin, followed by enough stirring and dissolving, to prepare the coating liquid.

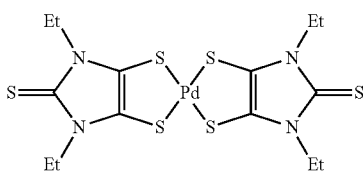

In the formula, Et represents an ethyl group.

The spectral transmittance curves (incident angles: "0" (zero) degree and 30 degrees) of the respective infrared cut filters obtained in the examples and the comparative examples were measured, and from these measurement results, an average transmittance in the wavelength range of 450 to 600 nm, a transmittance in the wavelength range of 700 to 1200 nm, and a value (D) calculated by the following expression was found when a maximum transmittance was set to be Tmax, a minimum transmittance was set to be Tmin, a wavelength showing the maximum transmittance Tmax was set to be $\lambda(Tmax)$, and a wavelength showing the minimum transmittance Tmin was set to be $\lambda(Tmin)$ in a wavelength range of 1100 to 1250 nm.

$$D(\%/nm)=(Tmax-Tmin)/\{\lambda(Tmax)-\lambda(Tmin)\}$$

Results are illustrated in Table 7.

Besides, the spectral transmittance curves (incident angles: "0" (zero) degree and 30 degrees) of the dielectric multilayer films formed in the examples and the comparative examples were measured (the spectral transmittance curve for the incident angle of 26 degrees was further measured in the comparative example 3), then the following (1) to (5) were found from measurement results thereof. Note that the spectral transmittance curve of the dielectric multilayer film was measured by forming the dielectric multilayer film having the same constitution at one principal surface of the glass substrate, and the three-layer anti-reflection film made up of magnesium fluoride, zirconia, and alumina as same as the example 1 was formed at the other principal surface of the glass substrate.
(1) The transmittance of the dielectric multilayer film in the wavelength range of 430 to 670 nm in the spectral transmittance curve for the incident angle of "0" (zero) degree.
(2) The wavelength range of the dielectric multilayer film when the transmittance becomes 1% in the spectral transmittance curve for the incident angle of "0" (zero) degree.
(3) The transmittance of the dielectric multilayer film in the wavelength range of 430 to 650 nm in the spectral transmittance curve for the incident angle of 30 degrees.
(4) The wavelength range of the dielectric multilayer film when the transmittance becomes 1% in the spectral transmittance curve for the incident angle of 30 degrees.
(5) A ratio $[T_{1200}(30)/T_{1200}(0)]$ between a transmittance $T_{1200}(30)$ of the dielectric multilayer film at the wavelength of 1200 nm in the spectral transmittance curve for the incident angle of 30 degrees and a transmittance $T_{1200}(0)$ at the wavelength of 1200 nm in the spectral transmittance curve for the incident angle of "0" (zero) degree.
Results are represented together in Table 7.

Figure 8A:
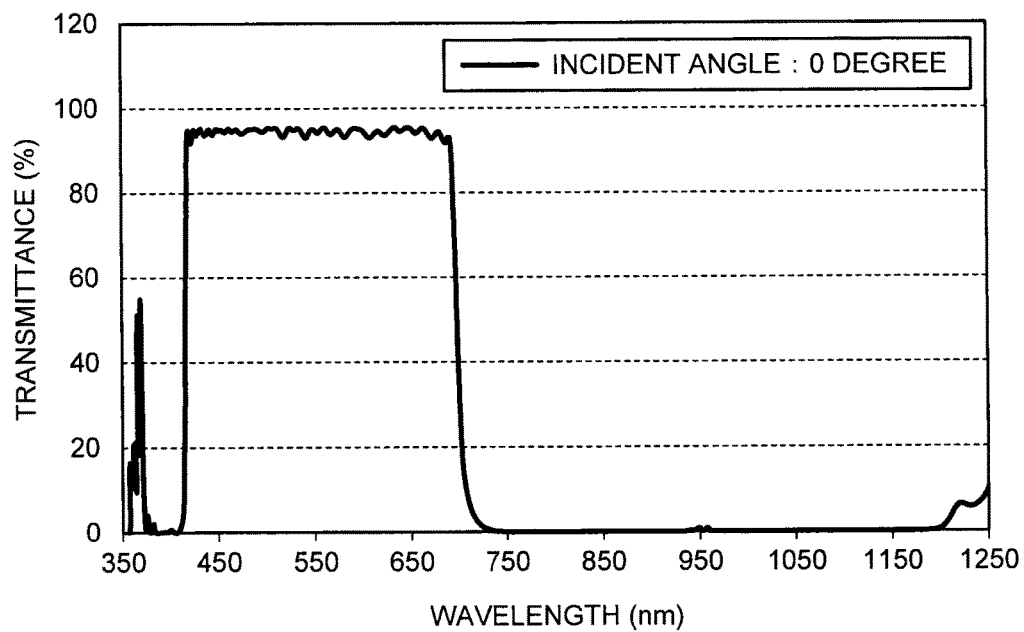
FIGS. 8A and 8B are views illustrating spectral transmittance curves measured as for dielectric multilayer films formed in an example 3, a comparative example 1, and a comparative example 4.
Figure 8B:
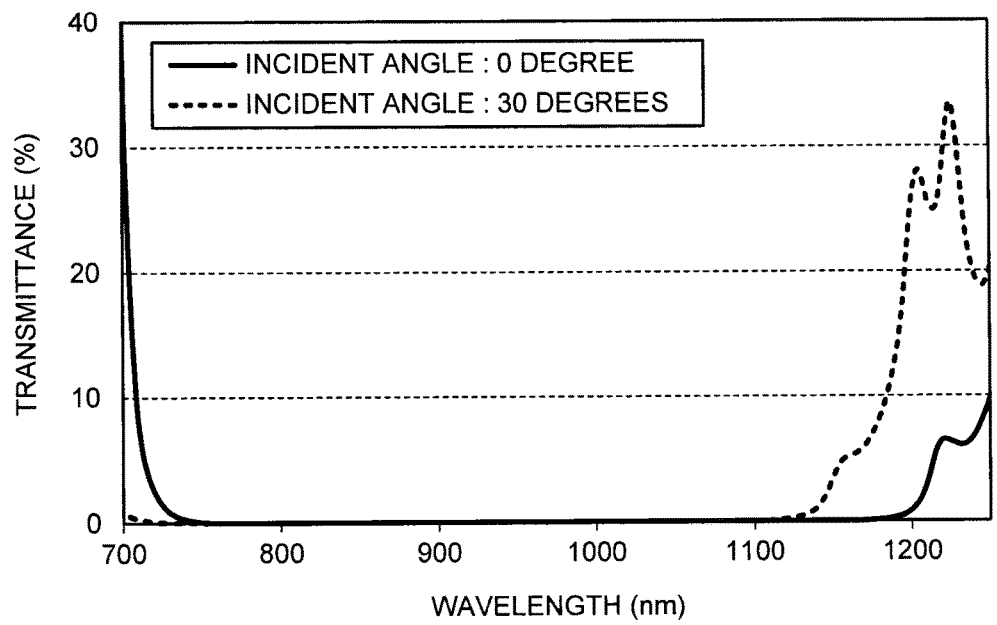

FIGS. 8A and 8B are spectral transmittance curves measured as for the dielectric multilayer films formed in the example 3, the comparative example 1, and the comparative example 4, where FIG. 8A represents the spectral transmittance curve (wavelength region: 350 to 1250 nm) for the incident angle of "0" (zero) degree, and FIG. 8B represents the spectral transmittance curves (wavelength region: 700 to 1250 nm) when the incident angles are "0" (zero) degree and 30 degrees.

Figure 9:
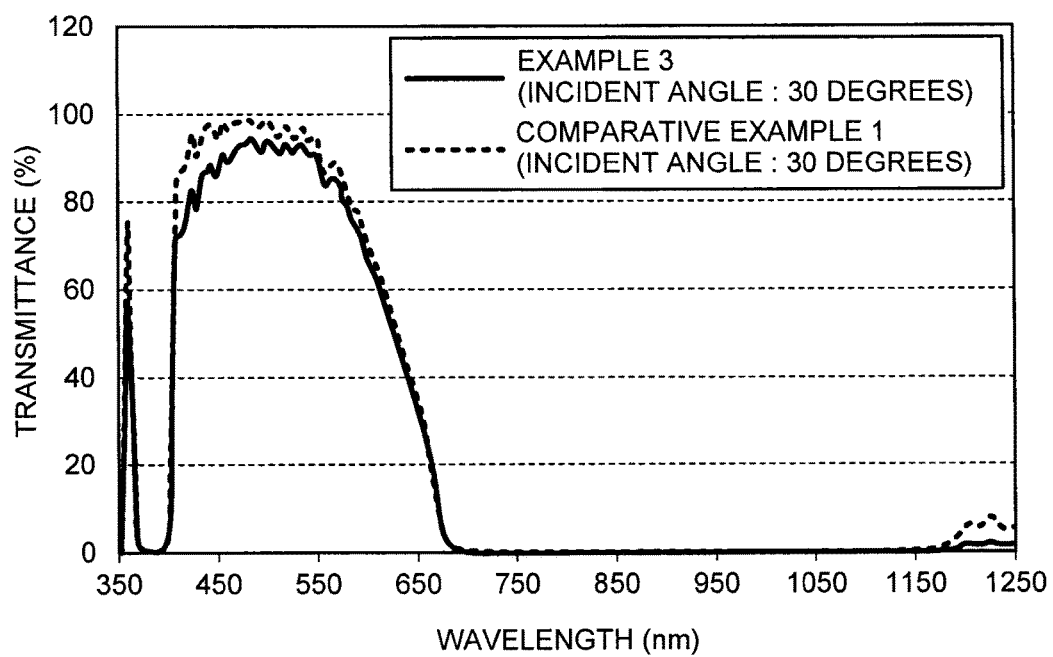
FIG. 9 is a view illustrating spectral transmittance curves measured as for each of infrared cut filters obtained in the example 3 and the comparative example 1.

FIG. 9 is a view illustrating spectral transmittance curves (incident angle: 30 degrees, wavelength region: 350 to 1250 nm) measured as for the respective infrared cut filters obtained in the example 3 and the comparative example 1. In the example 3, the transmittance for the visible light is high in the spectral transmittance curve for the incident angle of 30 degrees. Further, it can be seen that the absorption and cutting ability of the infrared light is fully exerted from 700 to 1250 nm independent from the incident angle.

Figure 10:
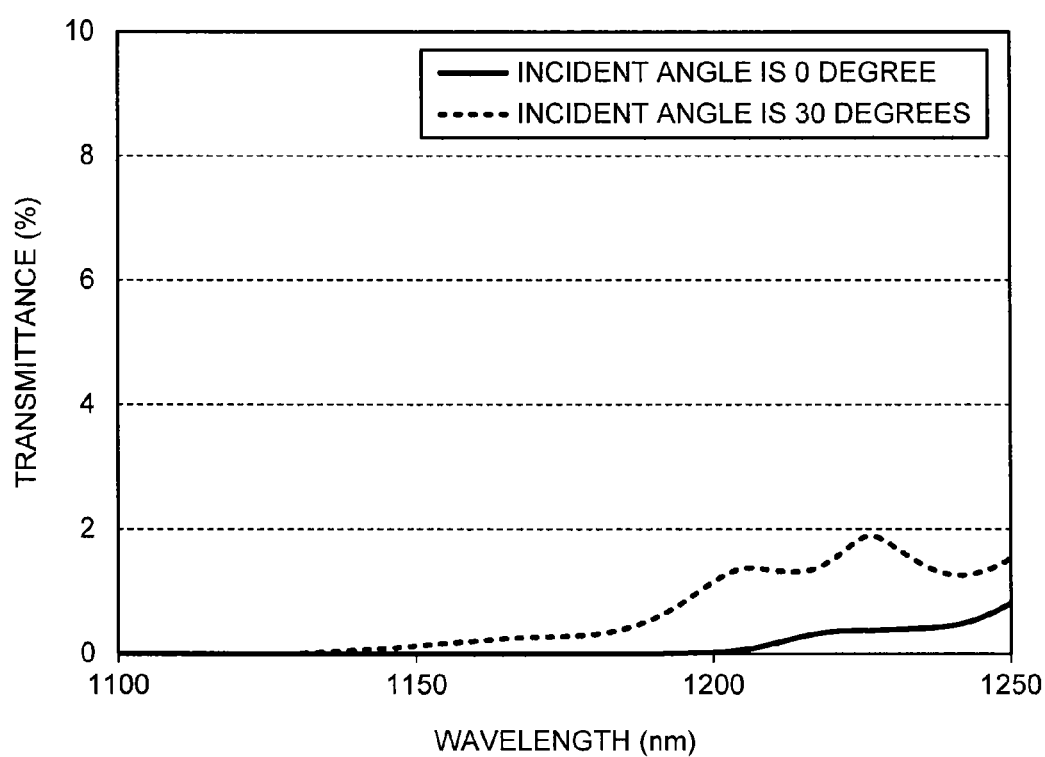
FIG. 10 is a view illustrating spectral transmittance curves measured as for the infrared cut filter obtained in the example 3.

FIG. 10 is a view illustrating spectral transmittance curves (incident angles: "0" (zero) degree and 30 degrees, wavelength region: 1100 to 1250 nm) measured as for the infrared cut filter obtained in the example 3. It can be seen that the example 3 includes the good infrared cutting ability capable of enough cutting the infrared light independent from the incident angle of light even in the wavelength range of 1100 to 1250 nm.

Figure 11A:
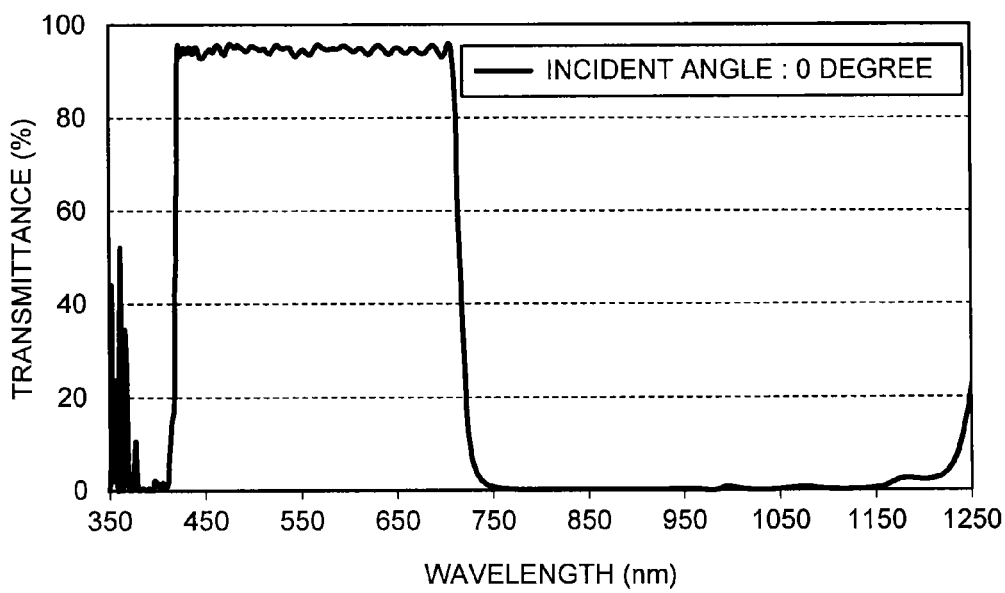
FIGS. 11A and 11B are views illustrating spectral transmittance curves measured as for dielectric multilayer films formed in an example 1, an example 2, and a comparative example 2.
Figure 11B:
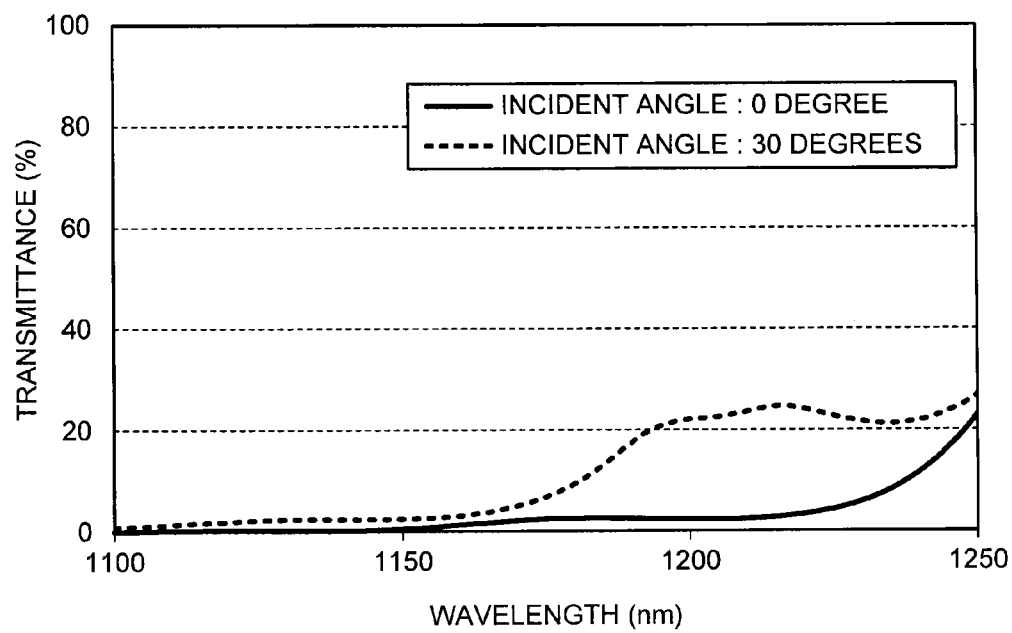

FIGS. 11A and 11B are spectral transmittance curves measured as for the dielectric multilayer films formed in the examples 1, 2, and the comparative example 2, where FIG. 11A represents the spectral transmittance curve (wavelength region: 350 to 1250 nm) for the incident angle of "0" (zero) degree, and FIG. 11B represents the spectral transmittance curves (wavelength region: 1100 to 1250 nm) when the incident angles are "0" (zero) degree and 30 degrees.

Figure 12:
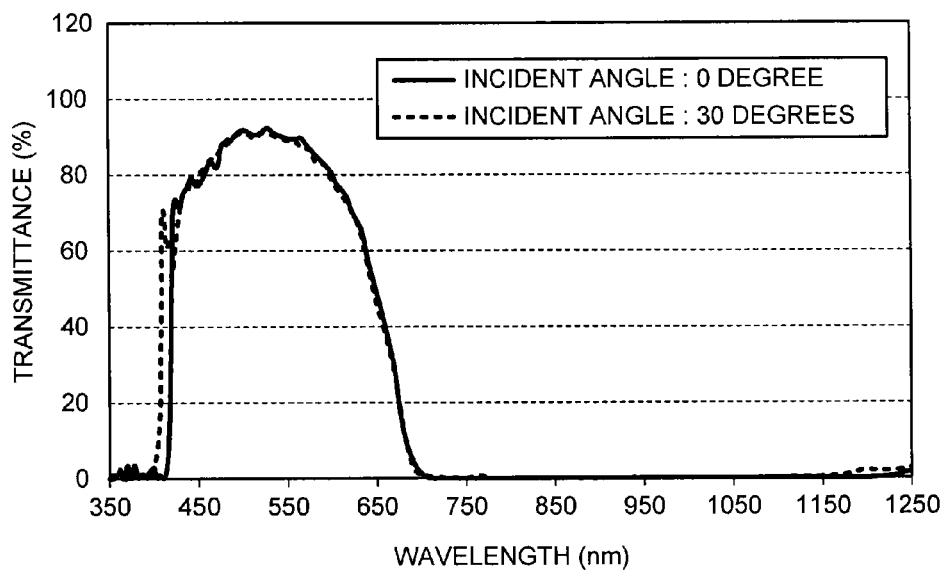
FIG. 12 is a view illustrating spectral transmittance curves measured as for the infrared cut filters obtained in the example 1, the example 2.

FIG. 12 is a view illustrating spectral transmittance curves (incident angles: "0" (zero) degree and 30 degrees, wavelength region: 350 to 1250 nm) measured as for the infrared cut filters obtained in the examples 1,2. In the examples 1,2, the transmittance for the visible light is high in the spectral transmittance curve for the incident angle of 30 degrees. Further, it can be seen that the absorption and cutting ability of the infrared light is fully exerted from 700 to 1250 nm independent from the incident angle.

Figure 13:
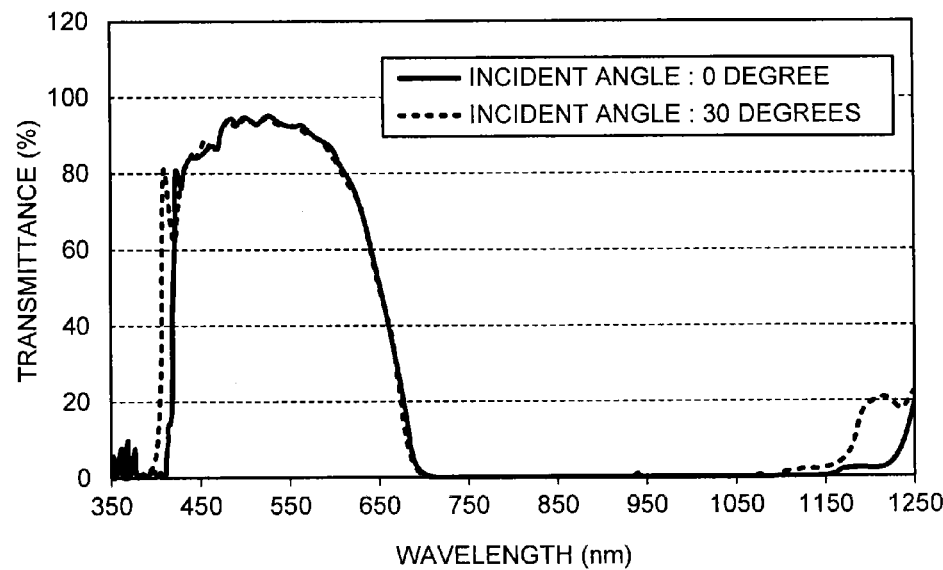
FIG. 13 is a view illustrating spectral transmittance curves measured as for the infrared cut filter obtained in the comparative example 2.

FIG. 13 is a view illustrating spectral transmittance curves (incident angles: "0" (zero) degree and 30 degrees, wavelength region: 350 to 1250 nm) measured as for the infrared cut filter obtained in the comparative example 2. It can be seen that in the comparative example 2, the spectral transmittance changes dependent on the incident angle. In particular, it can be seen that an incident angle dependence of the transmittance in the range of 1100 to 1250 nm is large.

Figure 14:
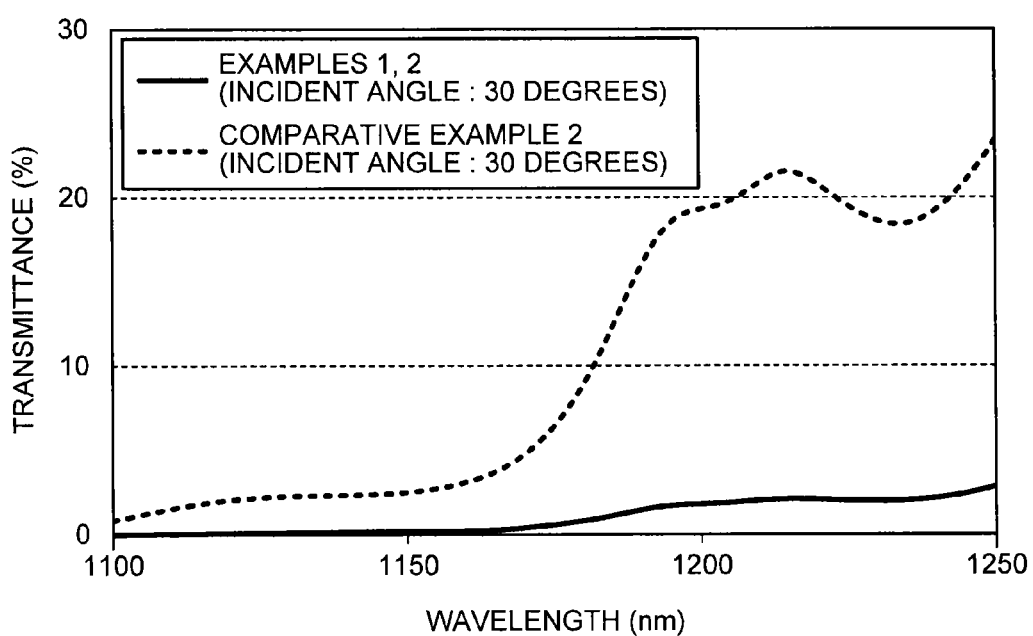
FIG. 14 is a view illustrating spectral transmittance curves measured as for the respective infrared cut filters obtained in the example 1, the example 2, and the comparative example 2.

FIG. 14 is a view comparatively representing the spectral transmittance curves (incident angle: 30 degrees, wavelength region: 1100 to 1250 nm) measured as for the respective infrared cut filters obtained in the examples 1, 2 and the comparative example 2. It can be seen that the examples 1, 2 each include the good infrared light cutting ability capable of enough cutting the infrared light even in the range of 1100 to 1250 nm independent from the incident angle of light.

Figure 15A:
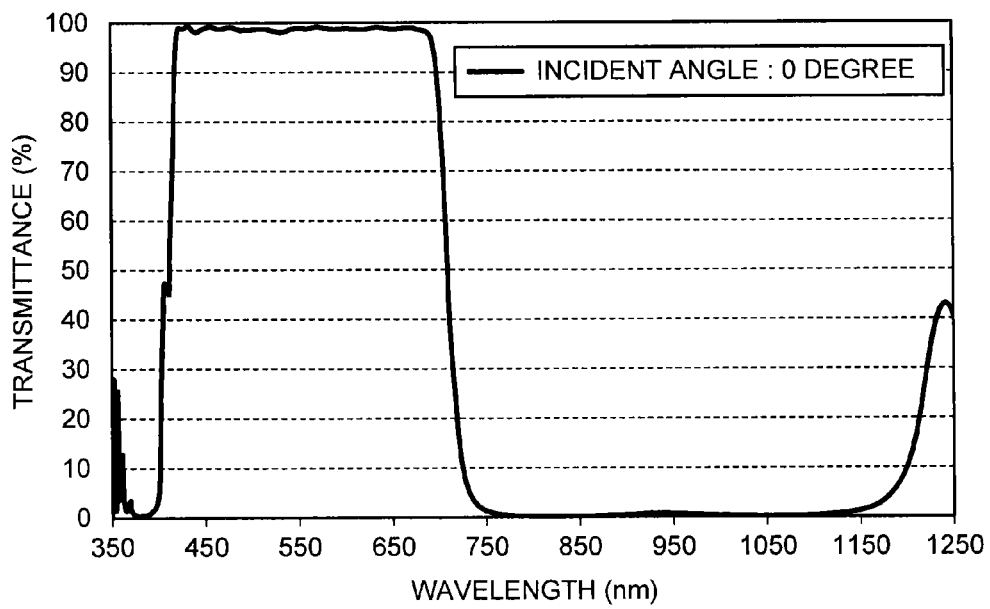
FIGS. 15A and 15B are views illustrating spectral transmittance curves measured as for a dielectric multilayer film formed in a comparative example 3.
Figure 15B:
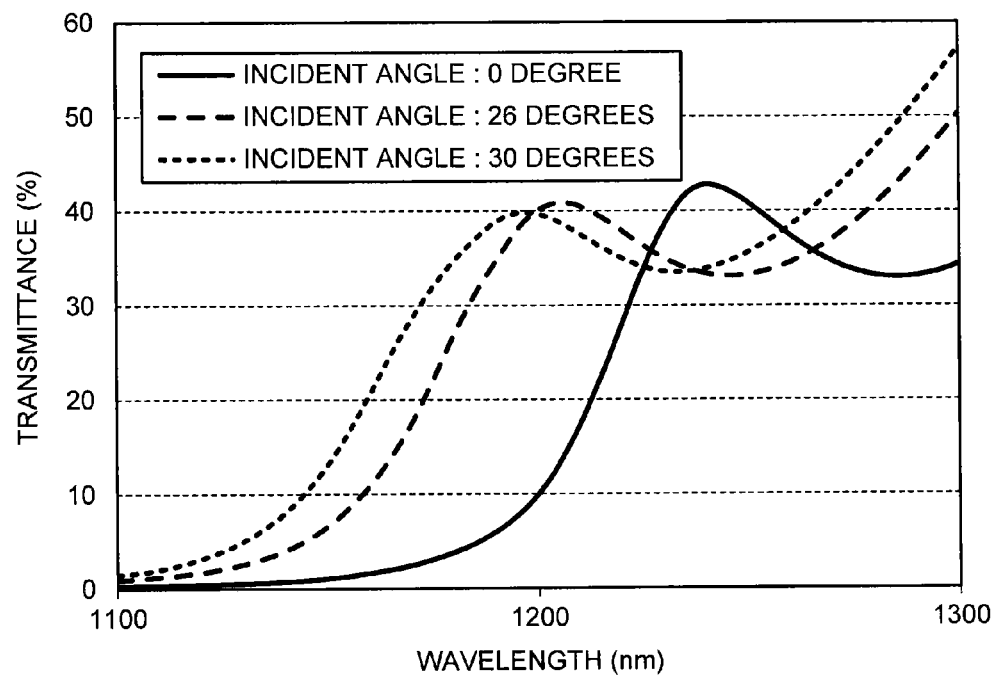

FIGS. 15A and 15B are spectral transmittance curves measured as for the dielectric multilayer film formed in the comparative example 3, where FIG. 15A represents the spectral transmittance curve (wavelength region: 350 to 1250 nm) for the incident angle of "0" (zero) degree, and FIG. 15B represents the spectral transmittance curves (wavelength region: 1100 to 1300 nm) when the incident angles are "0" (zero) degree, 26 degrees, and 30 degrees.

Figure 16A:
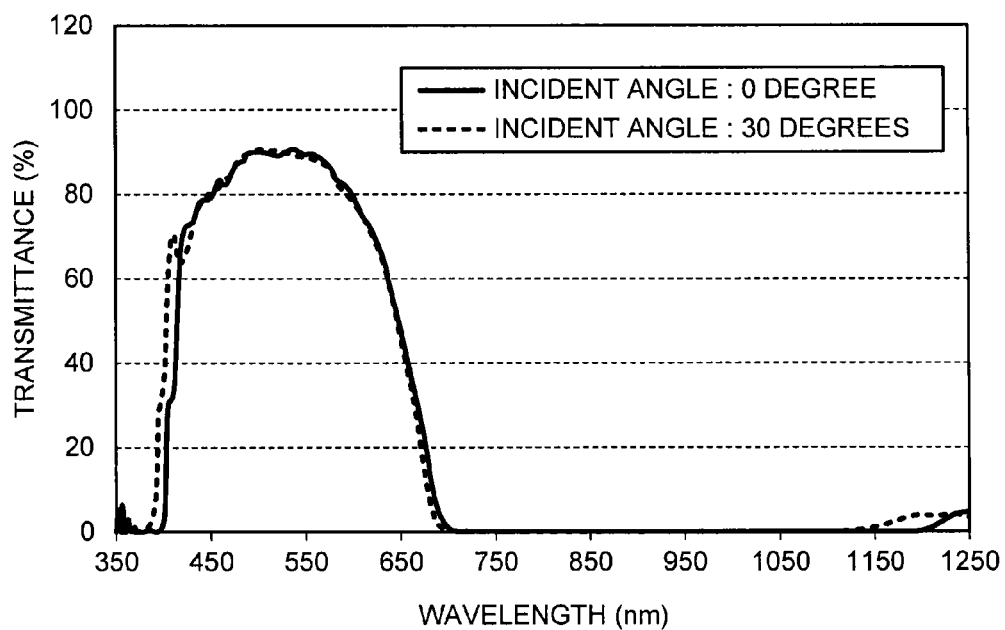
FIGS. 16A and 16B are views illustrating spectral transmittance curves measured as for an infrared cut filter obtained in the comparative example 3.
Figure 16B:
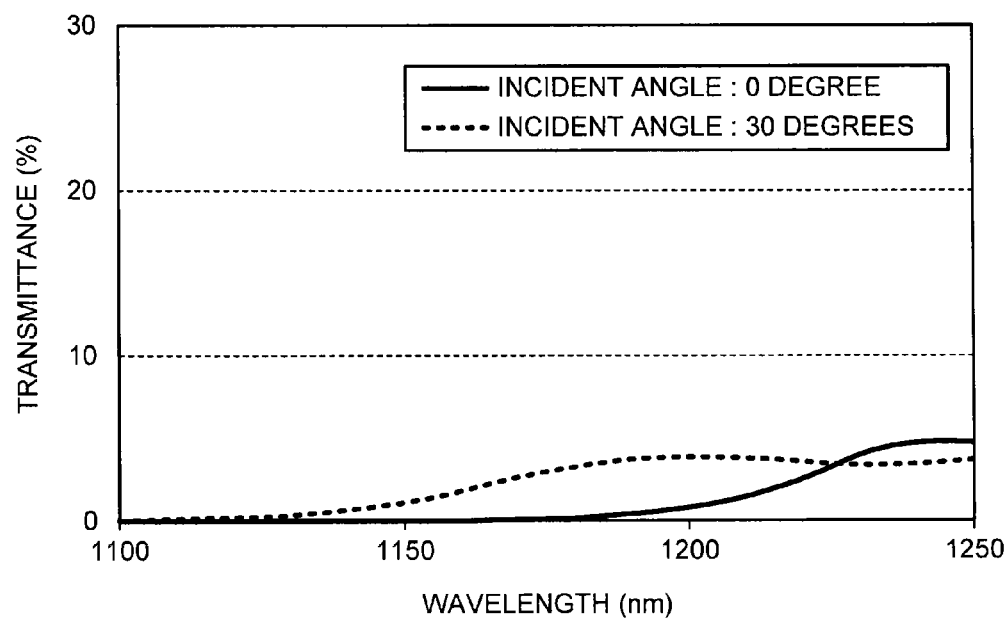
Figure 17A:
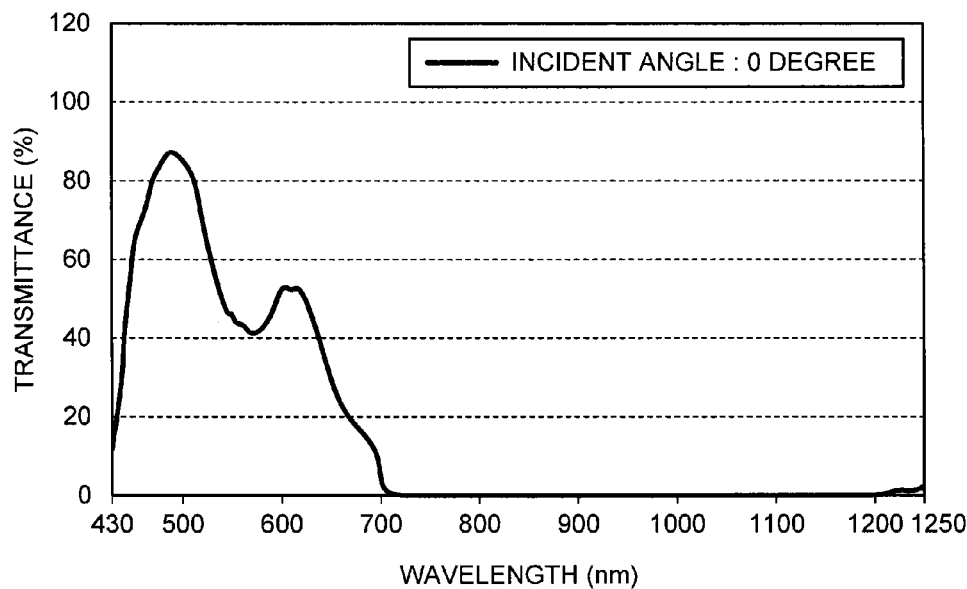
FIGS. 17A and 17B are views illustrating spectral transmittance curves measured as for an infrared cut filter obtained in the comparative example 4.
Figure 17B:
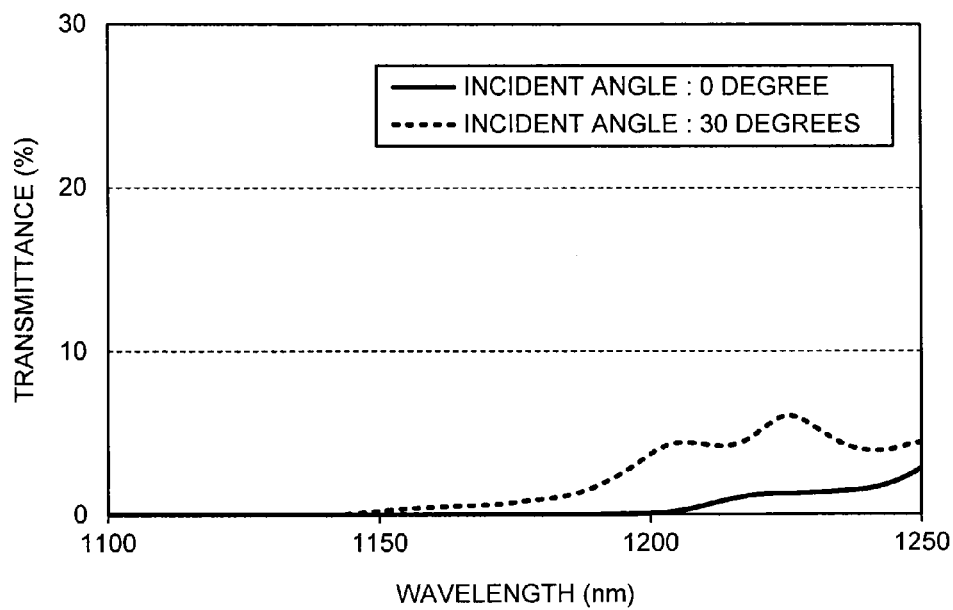

FIGS. 16A and 16B are spectral transmittance curves measured as for the infrared cut filter obtained in the comparative example 3, where FIG. 16A represents the spectral transmittance curves (wavelength region: 350 to 1250 nm) when the incident angles are "0" (zero) degree, and 30 degrees, and FIG. 16B represents the spectral transmittance curves (wavelength region: 1100 to 1250 nm) when the incident angles are "0" (zero) degree, and 30 degrees. FIGS. 17A and 17B are views illustrating spectral transmittance curves measured as for the infrared cut filter obtained in the comparative example 4, where FIG. 17A represents the spectral transmittance curve (wavelength region: 430 to 1250 nm) for the incident angle of "0" (zero) degree, and FIG. 17B represents the spectral transmittance curves (wavelength region: 1100 to 1250 nm) when the incident angles are "0" (zero) degree, and 30 degrees.

TABLE 7

| | Optical characteristics of dielectric multilayer film | | | | | | | | | |
|---|---|---|---|---|---|---|---|---|---|---|
| | Incident angle: 0° | | Incident angle: 30° | | | Incident angle: 0° | | | Incident angle: 30° | |
| | Transmittance at wavelength of 430 to 670 nm | Wavelength range when transmittance is 1% or less (nm) | Transmittance at wavelength of 430 to 650 nm | Wavelength range when transmittance is 1% or less (nm) | $T_{1200}(30)/T_{1200}(0)$ | Average transmittance at wavelength of 450 to 600 nm | Transmittance at wavelength of 700 to 1200 nm | D (%/nm) | Average transmittance at wavelength of 450 to 600 nm | Transmittance at wavelength of 700 to 1200 nm | D (%/nm) |
| Example 1 | ≥90% | 744-1160 | ≥90% | 718-1104 | 10.0 | 87.6% | ≤0.2% | 0.017 | 87.2% | ≤1.7% | 0.018 |
| Example 2 | ≥90% | 744-1160 | ≥90% | 718-1104 | 10.0 | 87.6% | ≤0.2% | 0.017 | 87.2% | ≤1.7% | 0.018 |
| Example 3 | ≥90% | 728-1171 | ≥90% | 700-1139 | 28.0 | 88.9% | ≤0.1% | 0.006 | 87.6% | ≤1.2% | 0.015 |
| Comp. Exam1 | ≥90% | 728-1171 | ≥90% | 700-1139 | 28.0 | ≥90% | ≤0.2% | 0.020 | ≥90% | ≤5.3% | 0.063 |
| Comp. Exam2 | ≥90% | 744-1160 | ≥90% | 718-1104 | 10.0 | ≥90% | ≤2.1% | 0.150 | ≥90% | ≤20.3% | 0.170 |
| Comp. Exam3 | ≥90% | 751-1145 | ≥90% | 724-1089 | 3.8 | 87.1% | ≤0.8% | 0.033 | 86.6% | ≤4.0% | 0.039 |
| Comp. Exam4 | ≥90% | 728-1171 | ≥90% | 700-1139 | 28.0 | 62.9% | ≤0.1% | 0.017 | 62.0% | ≤3.8% | 0.030 |

As it is obvious from Table 7 or the like, in the examples, design flexibility and a control ability of transmission/cutting over a wide band at the visible wavelength band/near-infrared wavelength band held by a selected wavelength cut layer, and the absorption cutting ability held by the near-infrared absorbing layer over a relatively wide band independent from the incident angle are enough exerted, and thereby, the good infrared cutting ability capable of enough cutting the infrared light in the long-wavelength region over 1200 nm independent from the incident angle of light is included while keeping the high transmittance for the visible light.

The infrared cut filter of the present invention has a good infrared cut effect and problems such as lowering of production yield and increase in manufacturing cost are not incurred. Therefore, it is effective for use in an imaging apparatus such as a digital still camera, a display apparatus such as a plasma display, a glass window for a vehicle (such as an automobile), a lamp, and so on as an infrared cut filter capable of responding for severe requirements in recent years.

What is claimed is:
1. An infrared cut filter comprising:
   an infrared absorbing layer of a transparent resin comprising an infrared absorber; and
   a selected wavelength cut layer stacked on the infrared absorbing layer;
   wherein:
   (i) in a spectral transmittance curve for an incident angle of "0" (zero) degree, the infrared cut filter has:
      an average transmittance of 80% or more at wavelengths in a range of 450 to 600 nm;
      a transmittance of 2% or less at all wavelengths in a range of 700 to 1200 nm; and
      a transmittance variation $D_0$ represented by the following expression (1) of less than 0.04:

$$D_0(\%/nm) = (Tmax \cdot 0 - Tmin \cdot 0)/(\lambda(Tmax \cdot 0) - \lambda(Tmin \cdot 0)) \quad (1)$$

wherein Tmax·0 and Tmin·0 are respectively a maximum transmittance and a minimum transmittance at wavelengths in a range of 1100 to 1250 nm, $\lambda(Tmax \cdot 0)$ is a wavelength having the maximum transmittance Tmax·0, and $\lambda(Tmin \cdot 0)$ is a wavelength having the minimum transmittance Tmin·0; and
   (ii) in a spectrum transmittance curve for an incident angle of 30 degrees, the infrared cut filter has:
      an average transmittance of 80% or more at wavelengths in a range of 450 to 600 nm;
      a transmittance of 2% or less at all wavelengths in a range of 700 to 1200 nm; and
      a transmittance variation $D_{30}$ represented by the following expression (2) of less than 0.04:

$$D_{30}(\%/nm) = (Tmax \cdot 30 - Tmin \cdot 30)/(\lambda(Tmax \cdot 30) - \lambda(Tmin \cdot 30)) \quad (2)$$

wherein Tmax·30 and Tmin·30 are respectively a maximum transmittance and a minimum transmittance at wavelengths in a range of 1100 to 1250 nm, $\lambda(Tmax \cdot 30)$ is a wavelength having the maximum transmittance Tmax·30, and $\lambda(Tmin \cdot 30)$ is a wavelength having the minimum transmittance Tmin·30.

2. The infrared cut filter according to claim 1, further comprising a transparent substrate supporting the infrared absorbing layer and the selected wavelength cut layer.

3. The infrared cut filter according to claim 1, wherein:
   (iii-1) in a spectral transmittance curve for the incident angle of "0" (zero) degree, the selected wavelength cut layer has:
      a transmittance of 90% or more at all wavelengths in a range of 430 to 670 nm; and a transmittance of 1% or less at all wavelengths in a range of λa to 1150 nm wherein λa is a maximum wavelength at which transmittance is 1% in a range of 670 to 800 nm;

(iii-2) in a spectral transmittance curve for the incident angle of 30 degrees, the selected wavelength cut layer has:

a transmittance of 90% or more at all wavelengths in a range of 430 to 650 nm; and a maximum wavelength at which transmittance is 1% in a range of λb to 1200 nm of 1100 nm or more, wherein λb is a maximum wavelength at which transmittance is 1% in a range of 670 to 800 nm; and (iii-3) the selected wavelength cut layer has a ratio $[T_{1200}(30)/T_{1200}(0)]$ of 40 or less, where $T_{1200}(30)$ is a transmittance at a wavelength of 1200 nm in the spectral transmittance curve for the incident angle of 30 degrees, and $T_{1200}(0)$ is a transmittance at a wavelength of 1200 nm in the spectral transmittance curve for the incident angle of "0" (zero) degree.

4. The infrared cut filter according to claim 1, wherein the infrared absorber has a light absorption spectrum at wavelengths in a range of 700 to 1300 nm when dissolved in a solvent having refractive index ($n_d$) of less than 1.5, and the light absorption spectrum has:

(iv-1) a maximum absorption wavelength $\lambda_{max}$ in a range of from 1100 to 1250 nm; and (iv-2) a shortest wavelength at which an absorbance calculated by setting an absorbance at the maximum absorption wavelength $\lambda_{max}$ as one of 0.2 in a range 1000 nm or less.

5. The infrared cut filter according to claim 1, wherein the infrared absorber comprises a compound having a dithiolene structure of the following general formula (1):

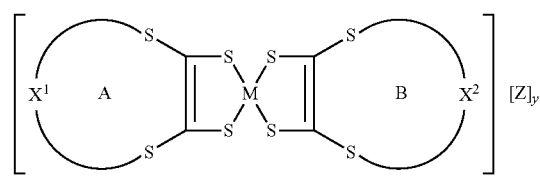
(F1)

wherein M represents an metal atom, $X^1$ represents a bivalent organic group constituting a heterocycle (ring A) together with a sulfur atom, $X^2$ represents a bivalent organic group constituting a heterocycle (ring B) together with the sulfur atom, Z represents a compound represented by $DR^1R^2R^3R^4$ wherein D represents a nitrogen atom, a phosphorus atom, or a bismuth atom, and each of $R^1$, $R^2$, $R^3$ and $R^4$ represents an alkyl group which may have a substituent group or an aryl group which may have the substituent group, and y represents "0" (zero) or 1.

6. The infrared cut filter according to claim 1, wherein the transparent resin comprises at least one selected from a group consisting of an acrylic resin, an epoxy resin, an ene-thiol resin, a polycarbonate resin, a polyether resin, a polyarylate resin, a polysulfone resin, a polyethersulfone resin, a polyparaphenylene resin, a polyarylene ether phosphine oxide resin, a polyimide resin, a polyamideimide resin, a polyetyleneterephthalate resin, a polyethylenenaphthalate resin, a polyolefin resin, a cyclic olefin resin, and a polyester resin.

7. A solid-state imaging device comprising the infrared cut filter according to claim 1.

8. An imaging/display apparatus comprising the infrared cut filter according to claim 1.

* * * * *